United States Patent
Kouno

(10) Patent No.: US 10,887,526 B2
(45) Date of Patent: Jan. 5, 2021

(54) MONITORING SYSTEM, MONITORING METHOD, AND MONITORING PROGRAM

(71) Applicant: NEC CORPORATION, Tokyo (JP)

(72) Inventor: Tomoya Kouno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/401,624

(22) Filed: May 2, 2019

(65) Prior Publication Data
US 2019/0260941 A1  Aug. 22, 2019

Related U.S. Application Data

(63) Continuation of application No. 15/558,643, filed as application No. PCT/JP2016/001104 on Mar. 1, 2016.

(30) Foreign Application Priority Data

Mar. 17, 2015  (JP) .................................. 2015-052795

(51) Int. Cl.
*H04N 5/232* (2006.01)
*G08B 13/196* (2006.01)
(Continued)

(52) U.S. Cl.
CPC .......... *H04N 5/23296* (2013.01); *G06F 3/14* (2013.01); *G06K 9/4604* (2013.01); *G06T 7/70* (2017.01);
(Continued)

(58) Field of Classification Search
CPC .......... G08B 25/00; H04M 11/00; H04N 7/18; H04N 5/247; H04N 5/23296; G06F 9/14; G06K 9/4604; G06T 7/70
(Continued)

(56) References Cited

U.S. PATENT DOCUMENTS

2001/0010541 A1 *  8/2001  Fernandez ....... G08B 13/19608
                                                       348/143
2004/0169587 A1     9/2004  Washington
(Continued)

FOREIGN PATENT DOCUMENTS

DE       202008007520 U1    9/2008
EP           2302603 A1     3/2011
(Continued)

OTHER PUBLICATIONS

Communication dated Nov. 2, 2018, from the European Patent Office in counterpart European Application No. 16764414.5.
(Continued)

*Primary Examiner* — Loi H Tran
(74) *Attorney, Agent, or Firm* — Sughrue Mion, PLLC

(57) ABSTRACT

In a monitoring system, the management device causes a display device to display an image generated by capturing by the camera whose direction has been controlled; accepts designation of at least one tracking target, the at least one tracking target being designated from among moving objects in the displayed image by an operator; and performs tracking control comprising controlling a photographing range of the camera in such a way that the designated at least one tracking target is kept captured by the camera.

8 Claims, 17 Drawing Sheets

(51) Int. Cl.

| | | |
|---|---|---|
| G08B 25/00 | (2006.01) | |
| G08B 25/08 | (2006.01) | |
| H04M 11/00 | (2006.01) | |
| H04N 7/18 | (2006.01) | |
| G06T 7/70 | (2017.01) | |
| G06F 3/14 | (2006.01) | |
| G06K 9/46 | (2006.01) | |
| H04N 5/247 | (2006.01) | |

(52) U.S. Cl.
 CPC ....... *G08B 13/19608* (2013.01); *G08B 25/00* (2013.01); *G08B 25/08* (2013.01); *H04M 11/00* (2013.01); *H04N 5/247* (2013.01); *H04N 7/18* (2013.01)

(58) Field of Classification Search
 USPC ........................................................ 348/159
 See application file for complete search history.

(56) References Cited

U.S. PATENT DOCUMENTS

| | | | |
|---|---|---|---|
| 2009/0304374 A1 | 12/2009 | Fruehauf | |
| 2015/0078618 A1* | 3/2015 | Kim | G08B 13/19608 382/103 |
| 2016/0027292 A1* | 1/2016 | Kerning | H04W 4/90 455/404.2 |
| 2016/0217668 A1* | 7/2016 | Meganathan | G08B 13/00 |

FOREIGN PATENT DOCUMENTS

| | | |
|---|---|---|
| JP | 2002-74565 A | 3/2002 |
| JP | 2003-264640 A | 9/2003 |
| JP | 2004-328333 A | 11/2004 |
| JP | 2006-014206 A | 1/2006 |
| JP | 2007-243571 A | 9/2007 |
| JP | 2007328776 A | 12/2007 |
| JP | 2009-098774 A | 5/2009 |
| JP | 2010277444 A | 12/2010 |
| JP | 2011-018094 A | 1/2011 |
| JP | 2011-128911 A | 6/2011 |
| JP | 2011182172 A | 9/2011 |
| JP | 2012-008742 A | 1/2012 |
| JP | 2012-156752 A | 8/2012 |
| JP | 2016-66314 A | 4/2016 |

OTHER PUBLICATIONS

Communication dated Nov. 20, 2018, from the Japanese Patent Office in counterpart application No. 2017-506064.
International Search Report for PCT/JP2016/001104 dated May 24, 2016.
Communication dated Dec. 27, 2019 from the United States Patent and Trademark Office in U.S. Appl. No. 15/558,643.
Final Office Action dated Jun. 6, 2019 issued by the United States Patent and Trademark Office in U.S. Appl. No. 15/558,643.
Decision to Grant a Patent dated Mar. 24, 2020 in Japanese Application No. 2019-123639.

* cited by examiner

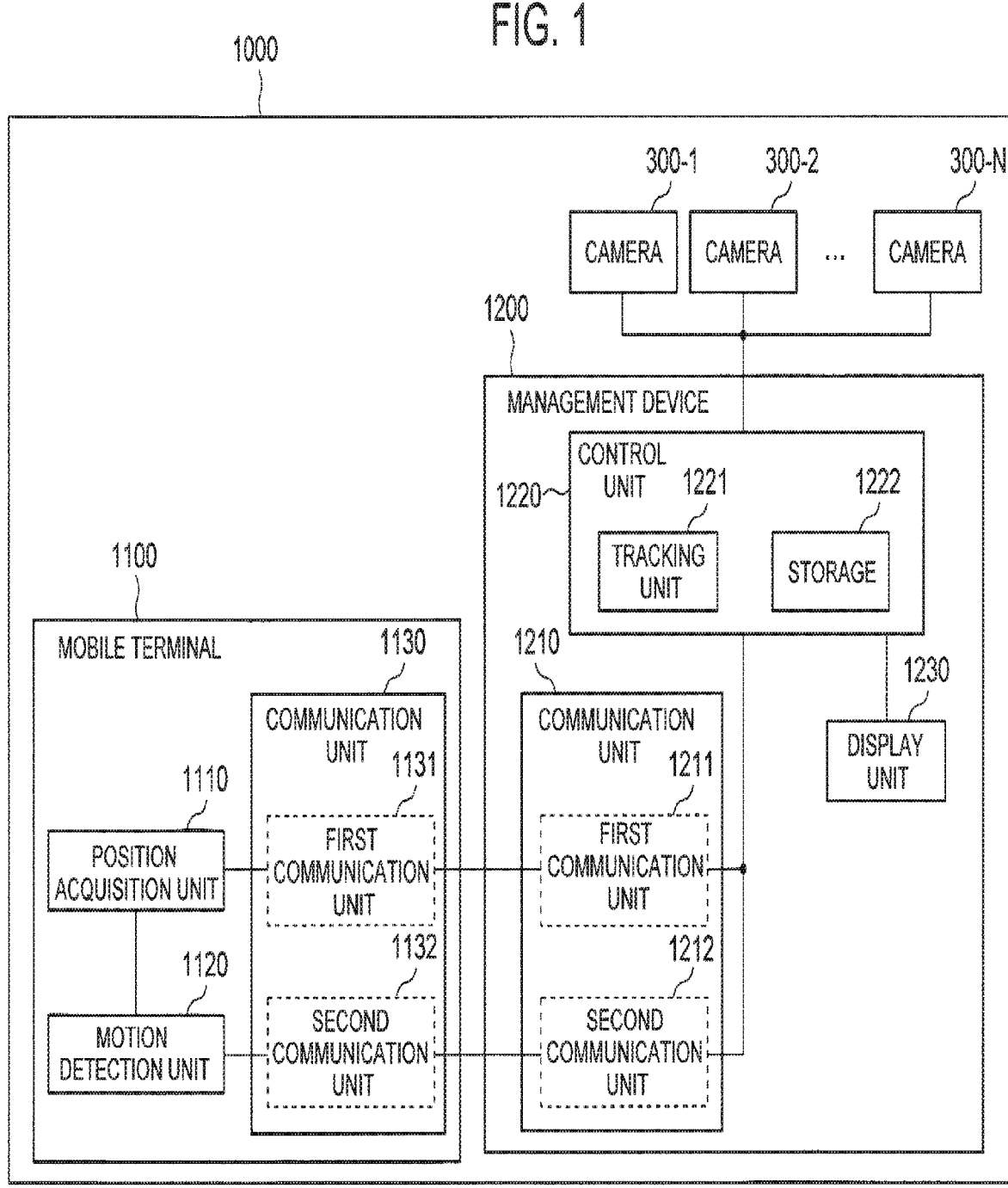

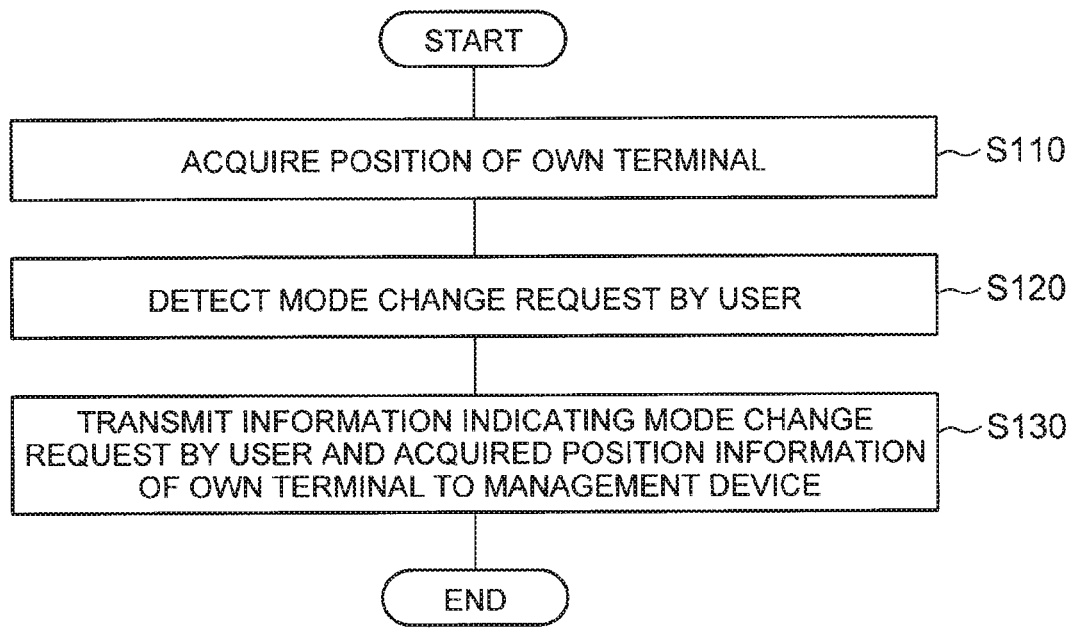
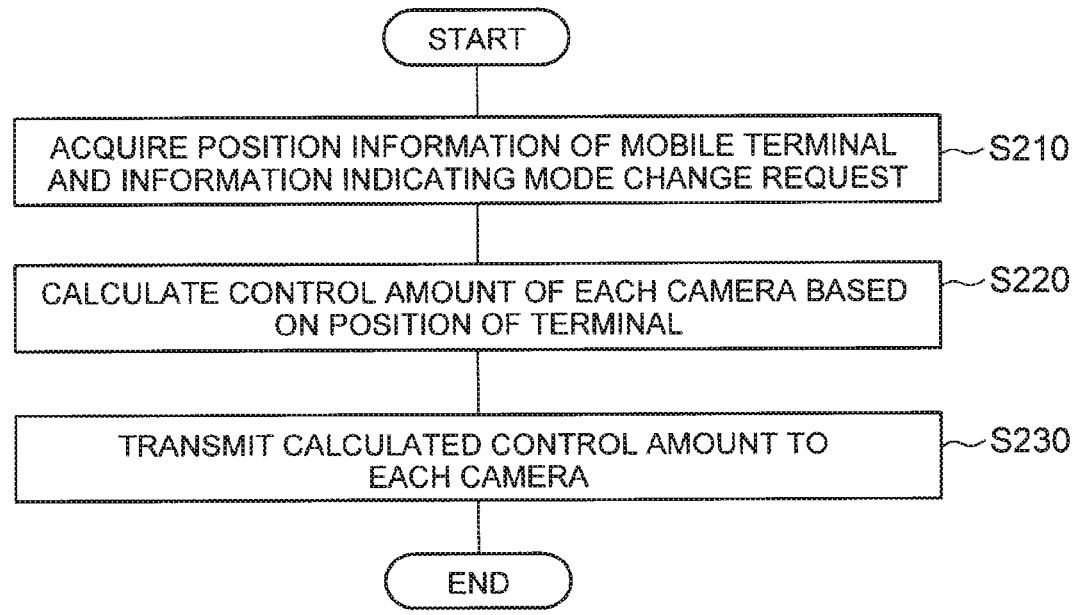

IMAGE PHOTOGRAPHED BY CAMERA 300-1

IMAGE PHOTOGRAPHED BY CAMERA 300-2

MONITORING SYSTEM, MONITORING METHOD, AND MONITORING PROGRAM

CROSS REFERENCE TO RELATED APPLICATIONS

This application is a Continuation of U.S. patent application Ser. No. 15/558,643 filed Sep. 15, 2017, which is a National Stage of International Application No. PCT/JP2016/001104 filed Mar. 1, 2016, claiming priority based on Japanese Patent Application No. 2015-052795 filed Mar. 17, 2015, the contents of all of which are incorporated herein by reference in their entirety.

TECHNICAL FIELD

The present invention relates to a monitoring system, a monitoring method, and a monitoring program, a monitoring system, and a facility monitoring system.

BACKGROUND ART

In the above technical field, Patent Literature 1 discloses a technique for transmitting, when it is detected that a user using a mobile communication terminal is in an unusual situation, the user's position information to a monitoring camera, and transmitting an image including the user acquired by the monitoring camera to a control center.

CITATION LIST

Patent Literature

PTL 1: Japanese Patent Application Laid-Open No. 2004-328333

SUMMARY OF INVENTION

Technical Problem

Here, in the above-mentioned Patent Literature 1, the user of the mobile communication terminal is a monitoring target, and the situation and condition of the user can be detected. However, the above-mentioned Patent Literature 1 is based on the assumption that the user of the mobile communication terminal does not move. Therefore, when the user of the mobile communication terminal is moving, if the camera is controlled to the position acquired from the mobile communication terminal and photographing is performed, the photographed image cannot necessarily include the user.

A purpose of the present invention is to provide a monitoring device, a monitoring method, a monitoring program, a monitoring system, and a facility monitoring system for solving the above problem.

Solution to Problem

A monitoring system according to the present invention includes a mobile terminal held by a security guard; and a management device configured to communicate with the mobile terminal, wherein the mobile terminal includes at least one processor configured to: transmit a request for switching a mode of control of a camera to the management device when a predetermined action performed by the security guard is detected; and transmit position information of the mobile terminal to the management device, and the management device includes at least one processor configured to: switch, when the request is received, the mode of control of the camera to a tracking mode in which the at least one processor in the management device controls a direction of the camera based on the position information in such a way that the camera is directed to a place indicated by the position information; cause a display device to display an image generated by capturing by the camera whose direction has been controlled; accept designation of at least one tracking target, the at least one tracking target being designated from among moving objects in the displayed image by an operator; and perform tracking control comprising controlling a photographing range of the camera in such a way that the designated at least one tracking target is kept captured by the camera.

A monitoring method according to the present invention includes receiving a request for switching a mode of control of a camera to from a mobile terminal, the mobile terminal being configured to transmit the request to the management device when a predetermined action performed by the security guard is detected; receiving position information of the mobile terminal from the management device; switching, when the request is received, the mode of control of the camera to a tracking mode in which the at least one processor in the management device controls a direction of the camera based on the position information in such a way that the camera is directed to a place indicated by the position information; causing a display device to display an image generated by capturing by the camera whose direction has been controlled; accepting designation of at least one tracking target, the at least one tracking target being designated from among moving objects in the displayed image by an operator; and performing tracking control comprising controlling a photographing range of the camera in such a way that the designated at least one tracking target is kept captured by the camera.

A storage medium according to the present invention stores a program that causes a computer to execute: receiving a request for switching a mode of control of a camera to from a mobile terminal, the mobile terminal being configured to transmit the request to the management device when a predetermined action performed by the security guard is detected; receiving position information of the mobile terminal from the management device; switching, when the request is received, the mode of control of the camera to a tracking mode in which the at least one processor in the management device controls a direction of the camera based on the position information in such a way that the camera is directed to a place indicated by the position information; causing a display device to display an image generated by capturing by the camera whose direction has been controlled; accepting designation of at least one tracking target, the at least one tracking target being designated from among moving objects in the displayed image by an operator; and performing tracking control comprising controlling a photographing range of the camera in such a way that the designated at least one tracking target is kept captured by the camera.

Advantageous Effects of Invention

It is possible to appropriately control a camera when a position of a user of a mobile terminal changes or when a monitoring target is different from the user of the mobile terminal.

BRIEF DESCRIPTION OF DRAWINGS

FIG. 1 It depicts a block diagram showing an example of a configuration of a monitoring system according to a first exemplary embodiment.

FIG. 2 It depicts a flowchart showing information transmission of a mobile terminal according to the first exemplary embodiment.

FIG. 3 It depicts a flowchart showing camera control by a management device according to the first exemplary embodiment.

DESCRIPTION OF EMBODIMENTS

First Exemplary Embodiment (Feature of the Invention)

In a monitoring system according to the present exemplary embodiment, a position where there is a mobile terminal is photographed based on position information of the mobile terminal held by a security guard. Thus, a monitoring camera is controlled and tracking candidates extracted from an image acquired by the monitoring camera are displayed to an operator of a management device. The feature is to prompt the operator of the management device to perform selection from the displayed tracking candidates.

(Configuration)

FIG. 1 is a block diagram showing an example of a configuration of a monitoring system 1000 according to the present exemplary embodiment. In the present exemplary embodiment, the monitoring system 1000 is a system for monitoring facilities such as ports, airports, platforms, important facilities including power plants, plants, and dams, warehouses, leisure facilities, stadiums, commercial facilities, buildings, cities, and streets. More specifically, it will be described, as an exemplary embodiment, that a facility in which monitoring by a security guard's patrolling and cameras is performed is monitored. Referring to FIG. 1, the monitoring system 1000 includes a mobile terminal 1100, a management device 1200, and cameras 300-1 to 300-N.

Figure 20:
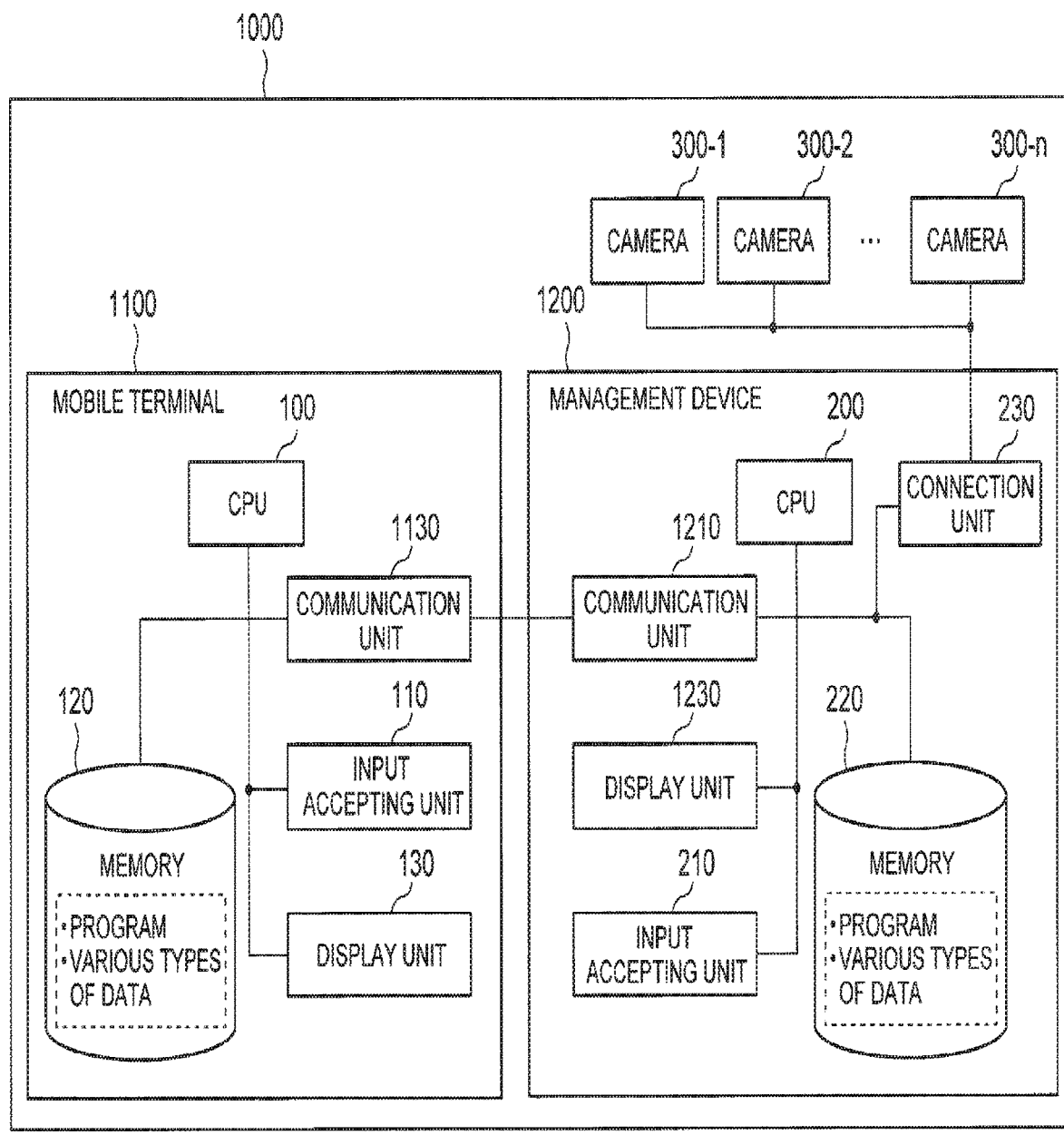
FIG. 20 It depicts a diagram showing a hardware configuration of the monitoring system according to the first exemplary embodiment.

The mobile terminal 1100 includes a position acquisition unit 1110, a motion detection unit 1120, and a communication unit 1130. Examples of the mobile terminal 1100 include a wireless device, a mobile phone, a smartphone, and a tablet terminal. The position acquisition unit 1110, the motion detection unit 1120, and the like can also be implemented by causing a computer constituting these devices to execute a computer program for performing processes using the hardware. As shown in FIG. 20, a central processing unit (CPU) 100 provided in the mobile terminal 1100 is connected to a memory 120 provided in the mobile terminal 1100, and functions based on a predetermined program read from the memory 120 or various types of data, and whereby the position acquisition unit 1110, the motion detection unit 1120, and the like may be implemented. More specific examples of the CPU 100 include a processor and a microprocessor. The CPU 100 of the mobile terminal 1100 may be connected to the communication unit 1130, an input accepting unit 110, and a display unit 130 via an input/output circuit. Here, the memory 120 may be configured as a random access memory (RAM) or a read only memory (ROM).

The position acquisition unit 1110 is connected to the motion detection unit 1120 and the communication unit 1130. The position acquisition unit 1110 further acquires real world coordinates as position information from a global positioning system (GPS) satellite. When acquiring position information of the mobile terminal 1100, the position acquisition unit 1110 transmits the position information of the mobile terminal 1100 to the communication unit 1130. In the present exemplary embodiment, the position information is acquired using a GPS satellite, but it is also possible to use a system which transmits and receives data using wireless communication, and calculates position information from the information of the access position. Here, the position information is real world coordinates which are coordinates unified in the real world, but is not necessarily limited thereto, and can contain information such as current time. Here, the real world coordinates may be constituted by information indicating longitude and latitude.

The motion detection unit 1120 is connected to the position acquisition unit 1110 and the communication unit 1130. The motion detection unit 1120 further detects a predetermined action of a security guard. When detecting the predetermined action of the security guard, the motion detection unit 1120 transmits, to the communication unit 1130, control switching information for requesting mode switching of control of the cameras 300-1 to 300-N. Here, the predetermined action means that the security guard operates the mobile terminal 1100. More specifically, when the security guard finds a suspicious person, a suspicious object, or the like during patrolling, the security guard operates the mobile terminal, and transmits, to the communication unit 1130, the control switching information requesting the mode switching of the control of the cameras 300-1 to 300-N. At this time, the security guard may photograph an image of a suspicious person, a suspicious object, or the like with the camera (not shown) of the mobile terminal 1100 and transmit the photographed image to the communication unit 1130 together with the position information of the mobile terminal 1100. Here, modes of the camera control will be described later.

The communication unit 1130 includes a first communication unit 1131 and a second communication unit 1132. The communication unit 1130 communicates with the management device 1200 via a communication network.

The first communication unit 1131 is connected to the position acquisition unit 1110. The first communication unit 1131 transmits the position information of the mobile terminal 1100 acquired by the position acquisition unit 1110 to the management device 1200 via the communication network. The first communication unit 1131 can receive information from the management device 1200. The first communication unit 1131 may transmit an image of a suspicious person, a suspicious object, or the like photographed by the camera (not shown) of the mobile terminal 1100 to the management device 1200 together with the position information of the mobile terminal 1100.

The second communication unit 1132 is connected to the motion detection unit 1120. The second communication unit 1132 transmits the control switching information to the management device 1200 via the communication network when the motion detection unit 1120 detects the predetermined action of the security guard. The second communication unit 1132 can receive information from the management device 1200. Here, the first communication unit 1131 and the second communication unit 1132 are only required to be functionally different and to independently perform transmission and reception. That is, the first communication unit 1131 and the second communication unit 1132 are not necessarily separated and can be implemented by one as a hardware configuration. The second communication unit 1132 may transmit the control switching information together with an image of a suspicious person, a suspicious object, or the like photographed by the camera (not shown) of the mobile terminal 1100.

The management device 1200 includes a communication unit 1210, a control unit 1220, and a display unit 1230. The management device 1200 is provided in a building where there is a security company that monitors an entire facility or in a security room installed in a monitored facility. The management device 1200 can be implemented when installed outside the facility as a management server. Furthermore, the management device 1200 can be not only an independent device but also be incorporated as one constituent element of the camera 300-1 to be described later. Here, the control unit 1220 can be implemented by a computer program causing a computer constituting these devices to perform processes by using the hardware. That is, as shown in FIG. 20, a CPU 200 provided in the management device 1200 is connected to a memory 220 provided in the management device 1200, and functions based on a predetermined program or various types of data read from the memory 220, and whereby the control unit 1220 may be implemented. More specific examples of the CPU 200 include a processor and a microprocessor. The CPU 200 of the management device 1200 may be connected to the communication unit 1210, an input accepting unit 210, and the display unit 1230 via an input/output circuit. A connection unit 230 of the management device 1200 is connected to the cameras 300-1 to 300-N. Here, the memory 220 may be configured as a RAM or a ROM.

The communication unit 1210 includes a first communication unit 1211 and a second communication unit 1212. The communication unit 1210 can transmit and receive information to and from the communication unit 1130 of the mobile terminal 1100. The communication unit 1210 further transmits the received information to the control unit 1220.

The first communication unit 1211 communicates with the first communication unit 1131 of the mobile terminal 1100 and receives the above position information of the mobile terminal 1100. The first communication unit 1211 transmits the received position information of the mobile terminal 1100 to the control unit 1220. The first communication unit 1211 can transmit information to the first communication unit 1131. The first communication unit 1211 may acquire the position information of the mobile terminal 1100 together with an image of a suspicious person, a suspicious object, or the like photographed by the camera (not shown) of the mobile terminal 1100.

The second communication unit 1212 communicates with the second communication unit 1132 of the mobile terminal 1100 via the communication network and receives the above control switching information. The second communication unit 1212 transmits the control switching information to the control unit 1220. The second communication unit 1212 can transmit information to the second communication unit 1132. Here, the first communication unit 1211 and the second communication unit 1212 are only required to be functionally different and to independently perform transmission and reception. That is, the first communication unit 1211 and the second communication unit 1212 are not necessarily separated and can be implemented by one as a hardware configuration. The second communication unit 1212 may acquire the control switching information together with an image of a suspicious person, a suspicious object, or the like photographed by the camera (not shown) of the mobile terminal 1100.

The control unit 1220 includes a tracking unit 1221 and a storage 1222. In addition, the control unit 1220 is connected to the communication unit 1210, the display unit 1230, and the cameras 300-1 to 300-N. The control unit 1220 controls the cameras based on the control switching information acquired from the communication unit 1210. More specifically, the control unit 1220 switches the camera control from a normal mode to a tracking mode in response to receiving the control switching information. Here, in the normal mode, a monitoring area is set to each of the cameras 300-1 to 300-N, and the control unit 1220 controls each of the cameras 300-1 to 300-N to photograph the set monitoring area. On the other hand, in the tracking mode, the control unit 1220 controls the photographing range of each of the cameras 300-1 to 300-N to the position indicated by the acquired position information of the mobile terminal 1100 and tracks a tracking target. That is, the control unit 1220 controls the Pan-Tilt-Zoom (PTZ) of the cameras 300-1 to 300-N so that the cameras 300-1 to 300-N can photograph the position indicated by the position information of the mobile terminal 1100. The control unit 1220 further receives the images photographed by the cameras 300-1 to 300-N and transmits them to the display unit 1230. Here, the tracking means that an object detected in an image frame which is, for example, a previous image n−1 frame (n is a natural number) is to be determined as the identical object as an object detected in the current image frame (n frame), and the movement state of the object regarded to be identical is measured. More specifically, it means that the pan, tilt, and zoom of the camera is controlled so that the tracking target object is included in the image obtained by, for example, the camera 300-1.

When the mode is changed to the tracking mode, the tracking unit 1221 selects tracking candidates based on the images photographed by the cameras 300-1 to 300-N. The tracking unit 1221 starts tracking the tracking target designated by the operator of the management device 1200 from the tracking candidates. The detailed tracking procedure will be described later.

The storage 1222 is a storage medium such as a hard disc drive (HDD). The storage 1222 stores the images photographed by the cameras 300-1 to 300-N, the information on the positions where the cameras 300-1 to 300-N are installed, the moving direction of the mobile terminal 1100, the acceleration direction of the mobile terminal 1100, the control switching information, the position information of the mobile terminal 1100, the feature amounts of specific objects (people, animals, small airplanes, helicopters, and the like), the feature amounts of individual people, clothes, and the like of security guards.

The display unit 1230 includes a liquid crystal display device. The display unit 1230 displays the camera image obtained by the control unit 1220. The display unit 1230 further displays information on tracking target candidates, which is candidates for a tracking target, and displays information for prompting the operator to select a tracking target from the tracking candidates.

Each of the cameras 300-1 to 300-N is a complementary metal oxide semiconductor (CMOS) camera. Each of the cameras 300-1 to 300-N can change the photographing range by the Pan-Tilt-Zoom (PTZ) control. Here, in the present exemplary embodiment, the camera is a CMOS camera, but may be a charge coupled devices (CCD) camera, an infrared camera, or the like, and may be any camera as long as it is image acquisition means which can acquire an image from which a feature amount can be extracted. Furthermore, the cameras 300-1 to 300-N are not necessarily the same camera, and may be various cameras. In the present exemplary embodiment, it has been exemplified that the camera 300-1 and the management device 1200 are configured as separate devices, but the monitoring system 1000 may include an intelligent camera in which the camera 300-1 and the management device 1200 are integrated. Furthermore, the monitoring system 1000 may have a configuration in which the management device 1200 is embedded in each of the cameras 300-1 to 300-N, or the management device 1200 is incorporated only in the camera 300-1 and controls the other cameras.

(Control by Mobile Terminal)

Next, a control procedure in the mobile terminal 1100 will be described with reference to FIG. 2. FIG. 2 is a flowchart showing that the mobile terminal 1100 transmits information to the management device 1200.

In step S110, the position acquisition unit 1110 acquires the position information of the own terminal from the GPS satellite. The position acquisition unit 1110 transmits the acquired position information to the first communication unit 1131. Here, the position acquisition unit 1110 acquires the position information at a predetermined interval (for example, every 10 seconds). The predetermined interval may be a variable cycle or a random cycle. As another example of the predetermined interval, the position acquisition unit 1110 may acquire the position information when a request from the security guard to the mobile terminal 1100 is made. In this case, the predetermined interval is the time when a request from the security guard to the mobile terminal 1100 is made.

In step S120, the motion detection unit 1120 accepts, from the security guard, control switching information which is a request for switching monitoring control (more specifically, camera control) from the normal mode to the tracking mode. The motion detection unit 1120 transmits the acquired control switching information to the second communication unit 1132. Here, sequentially in steps S110 and S120, the position acquisition unit 1110 acquires the position information of the mobile terminal 1100 separately and independently from the process that the motion detection unit 1120 acquires the control switching information. The position acquisition unit 1110 and the motion detection unit 1120 may acquire each information at the same time. The motion detection unit 1120 may acquire the control switching information together with an image of a suspicious person, a suspicious object, or the like photographed by the camera (not shown) of the mobile terminal 1100.

In step S130, the first communication unit 1131 transmits the acquired position information of the mobile terminal 1100 to the management device 1200 via the first communication unit 1211. The second communication unit 1132 transmits the acquired control switching information to the management device 1200 via the second communication unit 1212. Here, the first communication unit 1131 transmits information to the management device 1200 every time the position acquisition unit 1110 acquires the position information of the mobile terminal 1100 at a predetermined interval (for example, periodically). That is, the first communication unit 1131 transmits the position information of the mobile terminal 1100 to the management device 1200 at the predetermined interval (for example, periodically). Alternatively, the first communication unit 1131 or the second communication unit 1132 may transmit an image of a suspicious person, a suspicious object, or the like photographed by the camera (not shown) of the mobile terminal 1100. Here, the predetermined interval for acquiring the position information by the position acquisition unit 1110 and the predetermined interval for transmitting the position information by the first communication unit 1131 may be synchronous or asynchronous.

(Camera Control by Management Device)

Next, a procedure in which the management device 1200 controls the cameras 300-1 to 300-N will be described with reference to FIG. 3. FIG. 3 is a control flowchart showing that the management device 1200 controls the photographing ranges of the cameras 300-1 to 300-N.

In step S210, the first communication unit 1211 receives the position information of the mobile terminal 1100 from the mobile terminal 1100 and transmits the acquired information to the control unit 1220. The second communication unit 1212 receives the control switching information from the mobile terminal 1100, and transmits the acquired information to the control unit 1220. Alternatively, the first communication unit 1211 or the second communication unit 1212 may receive an image of a suspicious person, a suspicious object, or the like photographed by the camera (not shown) of the mobile terminal 1100.

In step S220, the control unit 1220 switches the mode of camera control from the normal mode to the tracking mode based on the control switching information. The control unit 1220 further controls the pan, tilt, and zoom of each of the cameras 300-1 to 300-N based on the acquired position information of the mobile terminal 1100. The more detailed algorithm is described below. First, the storage 1222 stores the positions which the cameras can photograph in advance. The control unit 1220 extracts combinations in which the real world coordinates which are the acquired position information are within the photographable range of the combinations of pan, tilt, and zoom stored in the storage 1222. Then, the control unit 1220 controls the pan, tilt, and zoom of the camera 300-1 to a target value which is the combination closest to the current combination among the extracted combinations of pan, tilt, and zoom. Here, the control unit 1220 selects the combination closest to the current combination, but may select a combination in which the real world coordinates which are the acquired position information are at the center of the camera.

The control unit 1220 can further detect the moving direction of the security guard and control the camera by predicting the current position of the security guard. Specifically, the control unit 1220 periodically receives the position information and the transmission time information of the mobile terminal 1100. Thereafter, the control unit 1220 calculates the moving direction and the moving speed of the security guard from the position information and transmission time of the mobile terminal 1100 received this time, and the position information and transmission time of the mobile terminal 1100 previously received. Next, the control unit 1220 calculates the expected moving amount based on the difference between the time at which the current position information is received and the current time, and the moving speed. The control unit 1220 predicts the position where the mobile terminal 1100 is to be located at the current time based on the calculated moving direction and expected moving amount of the security guard. Finally, the control unit 1220 controls the pan, tilt, and zoom of each of the cameras 300-1 to 300-N by the above method so as to include the predicted position information in the photographing range.

The control unit 1220 can further detect the moving direction of the security guard and control the cameras by predicting the future position of the security guard. Specifically, the control unit 1220 predicts the future position by performing the process similar to the above process for predicting the current position of the security guard to the future time as the prediction of the future position of the security guard.

In step S230, the control unit 1220 transmits the control amount calculated in step S220 to the cameras 300-1 to 300-N. After that, the procedure is ended. Here, the control unit 1220 may sequentially update the camera positions of the cameras 300-1 to 300-N based on the periodically acquired position information of the mobile terminal. With this configuration, if the security guard holding the mobile terminal 1100 has moved away from the previously acquired position, the photographing ranges of the cameras are updated, and it is possible to increase the possibility that the cameras 300-1 to 300-N capture the security guard.

(Tracking Control by Management Device)

Figure 4:
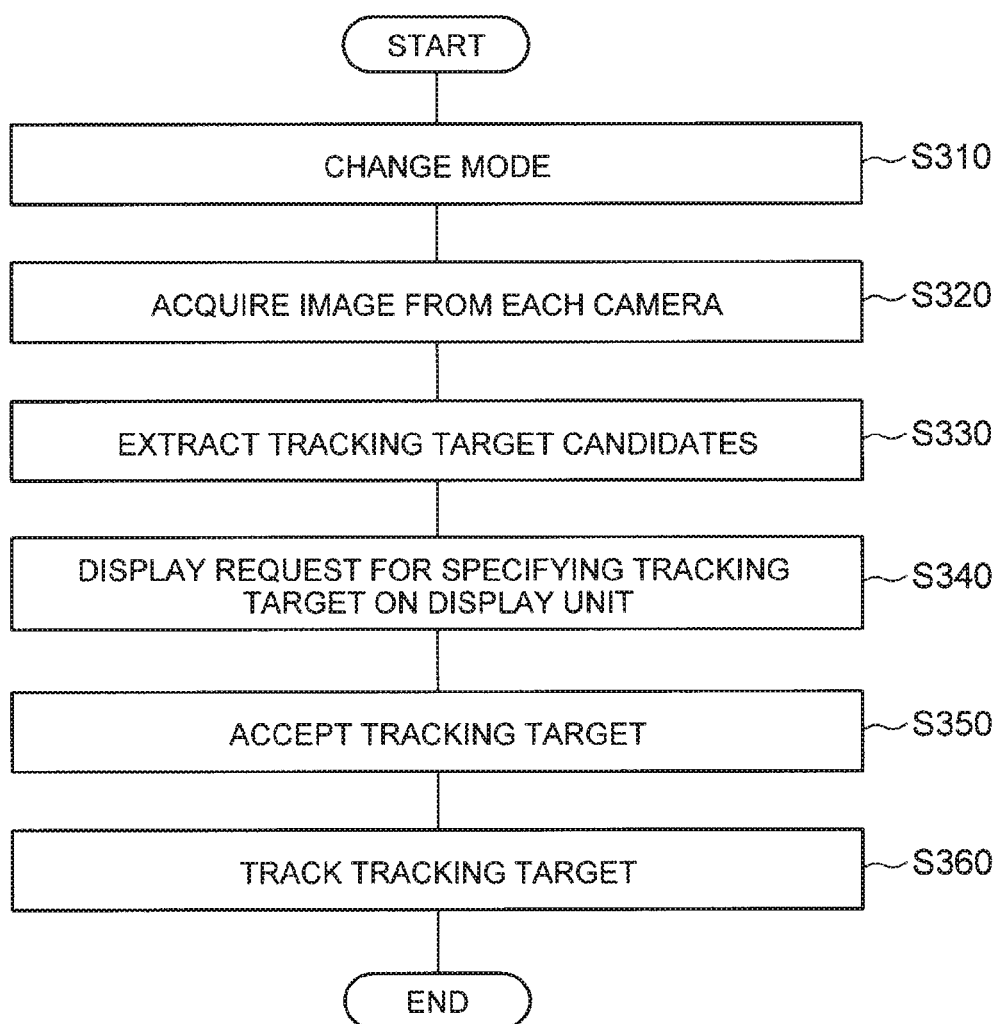
FIG. 4 It depicts a flowchart showing that the management device according to the first exemplary embodiment tracks a tracking target.

Next, a procedure of tracking control by the management device 1200 will be described with reference to FIG. 4. FIG. 4 is a flowchart of tracking control in which the management device 1200 performs tracking.

In step S310, when acquiring a mode change request, the control unit 1220 changes the camera control from the normal mode to the tracking mode.

In step S320, the tracking unit 1221 acquires the images photographed by the cameras 300-1 to 300-N. The tracking unit 1221 stores the images acquired from the cameras 300-1 to 300-N in the storage 1222.

In step S330, the tracking unit 1221 extracts the feature amount from the images acquired from the cameras 300-1 to 300-N. The tracking unit 1221 compares the extracted feature amount with the feature amount which is stored in advance in the storage 1222 and specifies individual people, and extracts person candidates. The tracking unit 1221 selects the tracking candidates from the extracted person candidates. Here, the tracking unit 1221 may acquire motion vectors indicating the moving amounts and the moving directions of a moving objects, and select only the moving objects as the tracking candidates. More specifically, the tracking unit 1221 reads a plurality of frames and compares the image data between flaims, and acquires the motion vector. Alternatively, the tracking unit 1221 may extract the tracking candidates by extracting a feature amount from the image of the suspicious person photographed by the camera (not shown) of the mobile terminal 1100 acquired by the first communication unit 1211 or the second communication unit 1212, and comparing the extracted feature amount with the feature amount extracted from the images acquired from the cameras 300-1 to 300-N. In the tracking control by the management device 1200, a person is extracted as a tracking candidate, but the tracking candidate is not limited to a person, and may be an animal, a moving object (a car or a motorcycle), or an aircraft (an airplane or a helicopter).

In step S340, the tracking unit 1221 outputs the images photographed by the cameras 300-1 to 300-N in step S320 and the tracking candidates extracted in step S330 to the display unit 1230. The display unit 1230 displays the images photographed by the cameras 300-1 to 300-N and highlights the tracking candidates extracted in step S330 in the images.

In step S350, the display unit 1230 accepts designation of one or more tracking targets by the operator. Here, the display unit 1230 accepts the designation by the operator, but the designation is not particularly limited, and the control unit 1220 may accept the designation by the operator.

In step S360, the tracking unit 1221 tracks the tracking target based on the designation of the tracking target. The specific detection algorithm of the tracking target is described below. The tracking unit 1221 predicts the position of the tracking target in the current frame based on the position of the tracking target detected in the previous frame. As this method, various existing methods such as a method using a Kalman filter or a particle filter can be used. Then, the tracking unit 1221 performs tracking based on the predicted position of the tracking target in the current frame and the image in the current frame. Note that, the tracking is not particularly limited to the above exemplary embodiment, and may be performed by associating the similarity or the likelihood of the feature amount of the tracking target with that of the object in the current frame. In addition, the control unit 1220 may transmit the images photographed by the cameras 300-1 to 300-N to the mobile terminal 1100 via the communication unit 1210. With the above configuration, if the security guard loses sight of the suspicious person, tracking can be started again. Alternatively, when there are a plurality of security guards and a plurality of mobile terminals, the control unit 1220 may transmit the image to the mobile terminals other than the mobile terminal the position information of which is acquired. Furthermore, while the tracking unit 1221 is tracking the tracking target, the control unit 1220 may analyze images photographed by the cameras 300-1 to 300-N generate metadata related to the tracking target, and store the metadata in the storage 1222 in association with the images. Here, the metadata is data of clothe colors, features of faces, and the like of the tracking target.

Specific Example of First Exemplary Embodiment

Figure 5:
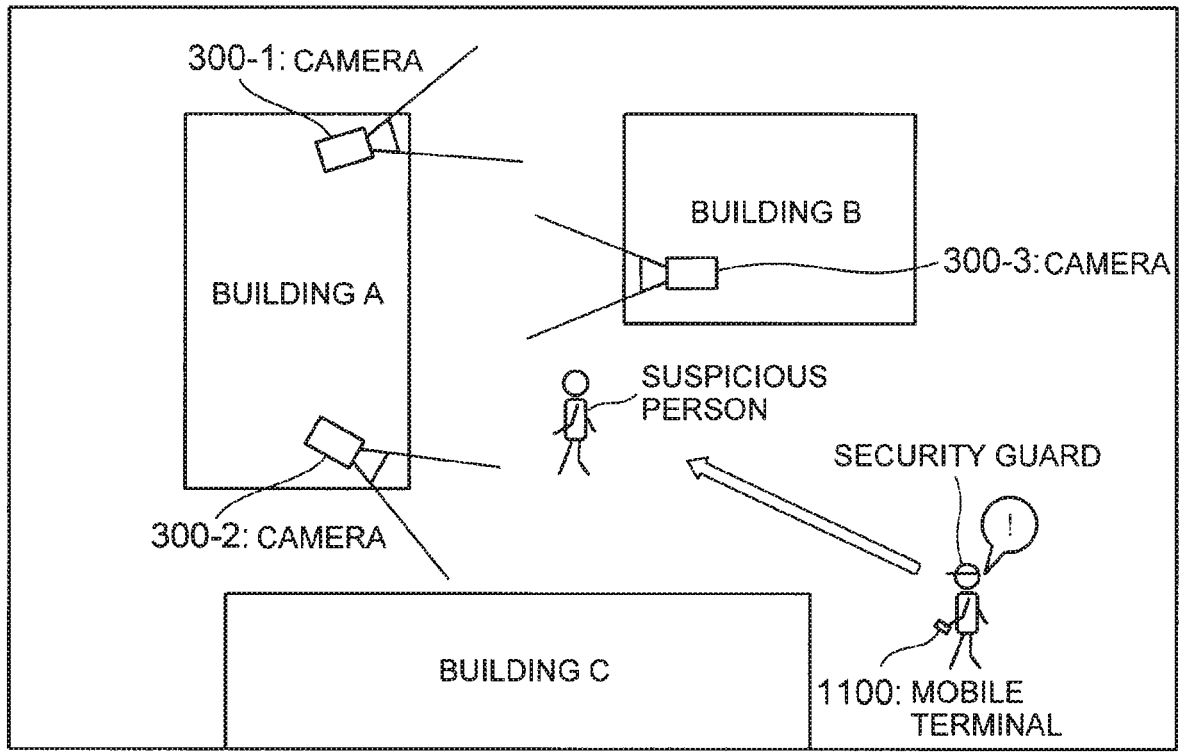
FIG. 5 It depicts an overhead view showing a specific example of an action when a security guard finds a suspicious person in the first exemplary embodiment.

Next, a specific example of the first exemplary embodiment will be described with reference to FIGS. 5 to 10. FIG. 5 is an overhead view showing a specific example of an action when the security guard finds a suspicious person in the first exemplary embodiment.

As a specific example, there are a building A, a building B, and a building C in a certain facility. The building A is provided with the camera 300-1 and the camera 300-2. The building B is provided with the camera 300-3. The suspicious person is at the center of FIG. 5. The security guard is at the lower right of FIG. 5. When the security guard finds the suspicious person, the security guard performs, to the mobile terminal 1100, an input operation to request the mode change. When accepting the input, the mobile terminal 1100 transmits the control switching information to the management device 1200 together with the position information of the mobile terminal 1100. Then, the security guard starts moving in the direction toward the suspicious person to secure the suspicious person. While the suspicious person is moving, the mobile terminal 1100 sequentially transmits the acquired position information to the management device 1200.

Figure 6:
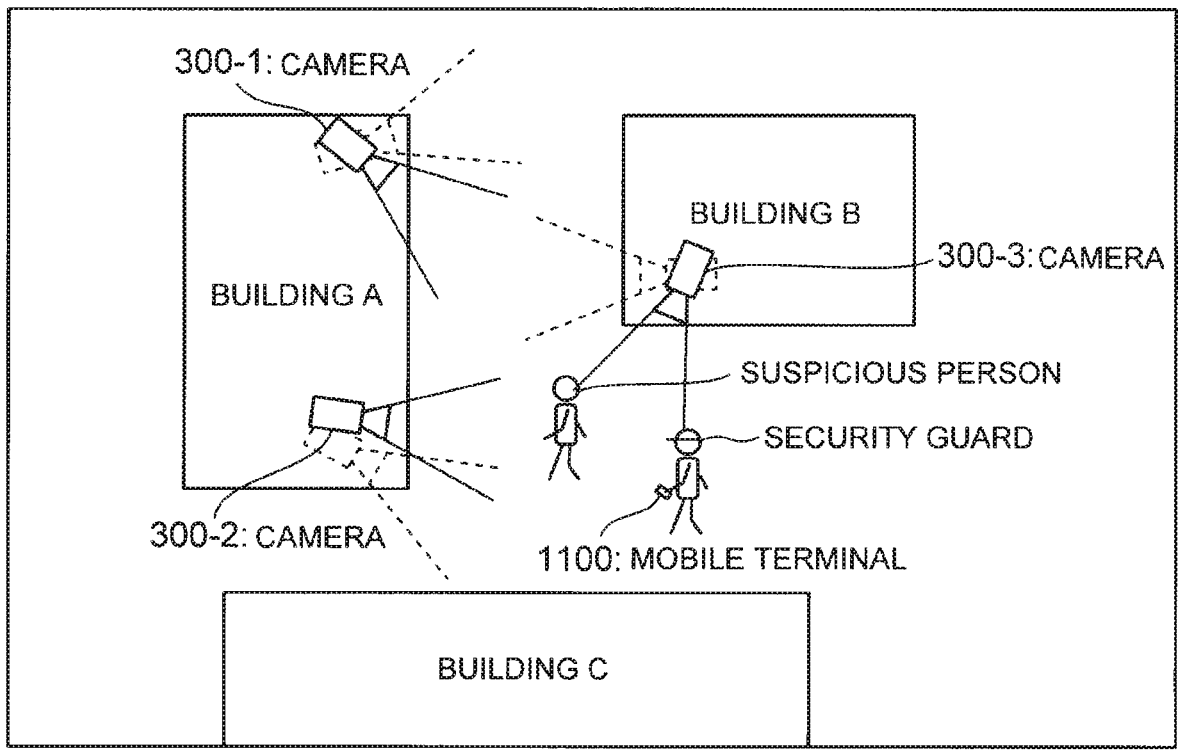
FIG. 6 It depicts an overhead view showing a specific example of the camera control by the management device according to the first exemplary embodiment.

FIG. 6 is an overhead view of camera control by the management device according to the first exemplary embodiment. In FIG. 6, when acquiring the control switching information from the mobile terminal 1100, the management device 1200 switches the mode for controlling the cameras 300-1 to 300-3 to the tracking mode. The management device 1200 turns, based on the acquired position information of the mobile terminal 1100, the visual-line directions of the cameras 300-1 to 300-3 to the acquired position of the mobile terminal 1100 (where the security guard is expected to exist).

Figure 7:
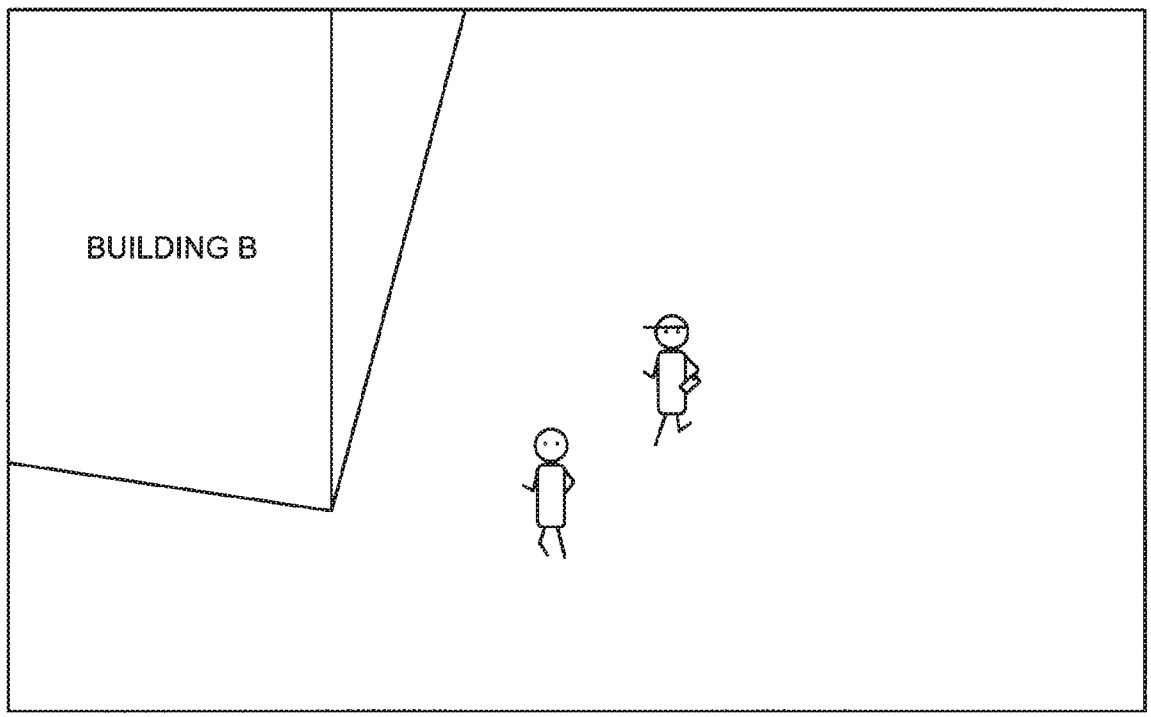
FIG. 7 It depicts a diagram showing a specific example of an image of a camera 300-1 in FIG. 6.
Figure 8:
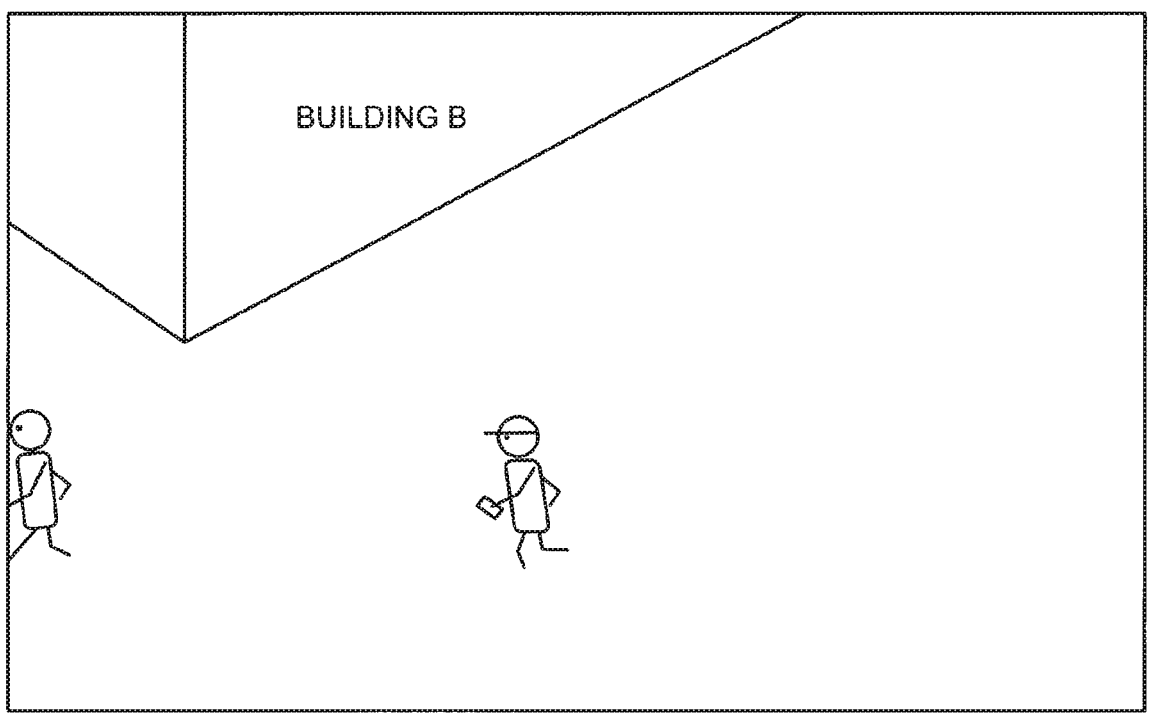
FIG. 8 It depicts a diagram showing a specific example of an image of a camera 300-2 in FIG. 6.
Figure 9:
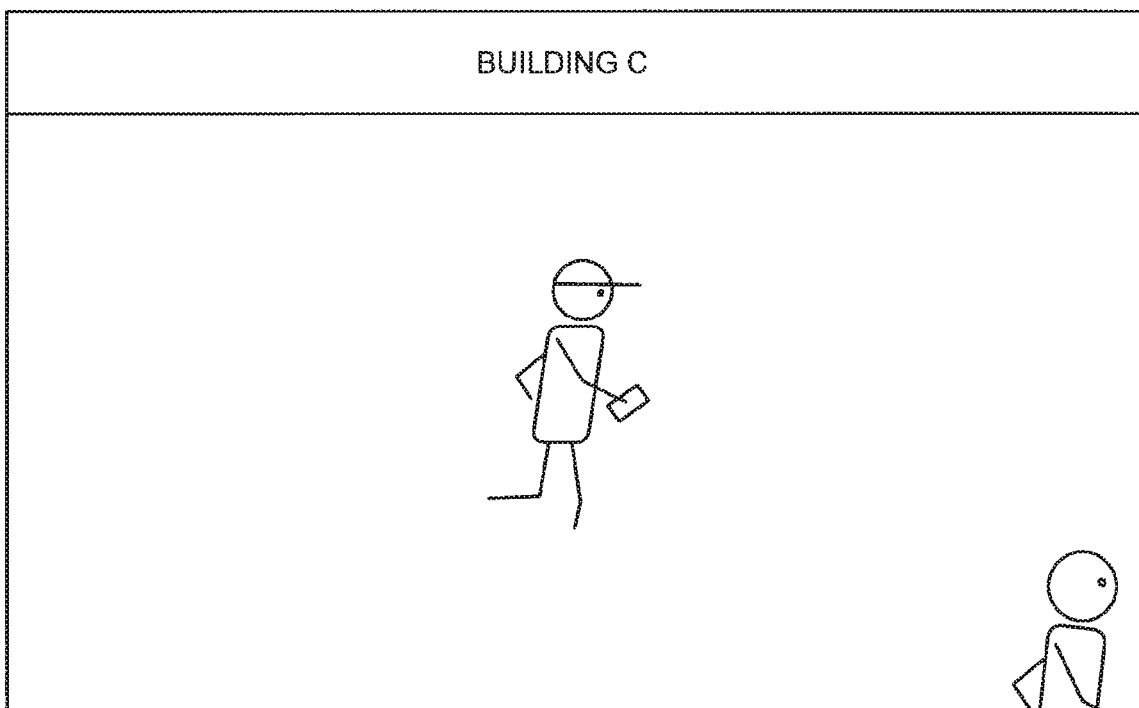
FIG. 9 It depicts a diagram showing a specific example of an image of a camera 300-3 in FIG. 6.

FIG. 7 is a diagram showing an image example photographed by the camera 300-1. The security guard and the suspicious person are photographed from a distance by the camera 300-1. FIG. 8 is a diagram showing an image example photographed by the camera 300-2. The security guard and the suspicious person are photographed from a medium distance by the camera 300-2. FIG. 9 is a diagram showing an image example photographed by the camera 300-3. The security guard and only the upper body of the suspicious person are photographed from a short distance by the camera 300-3. Since the control unit 1220 controls the focus target of the camera 300-3 to the position of the mobile terminal 1100, the camera 300-3 cannot capture the suspicious person. The images photographed by the cameras 300-1 to 300-3 are transmitted to the management device 1200 and stored in the storage 1222.

Figure 10:
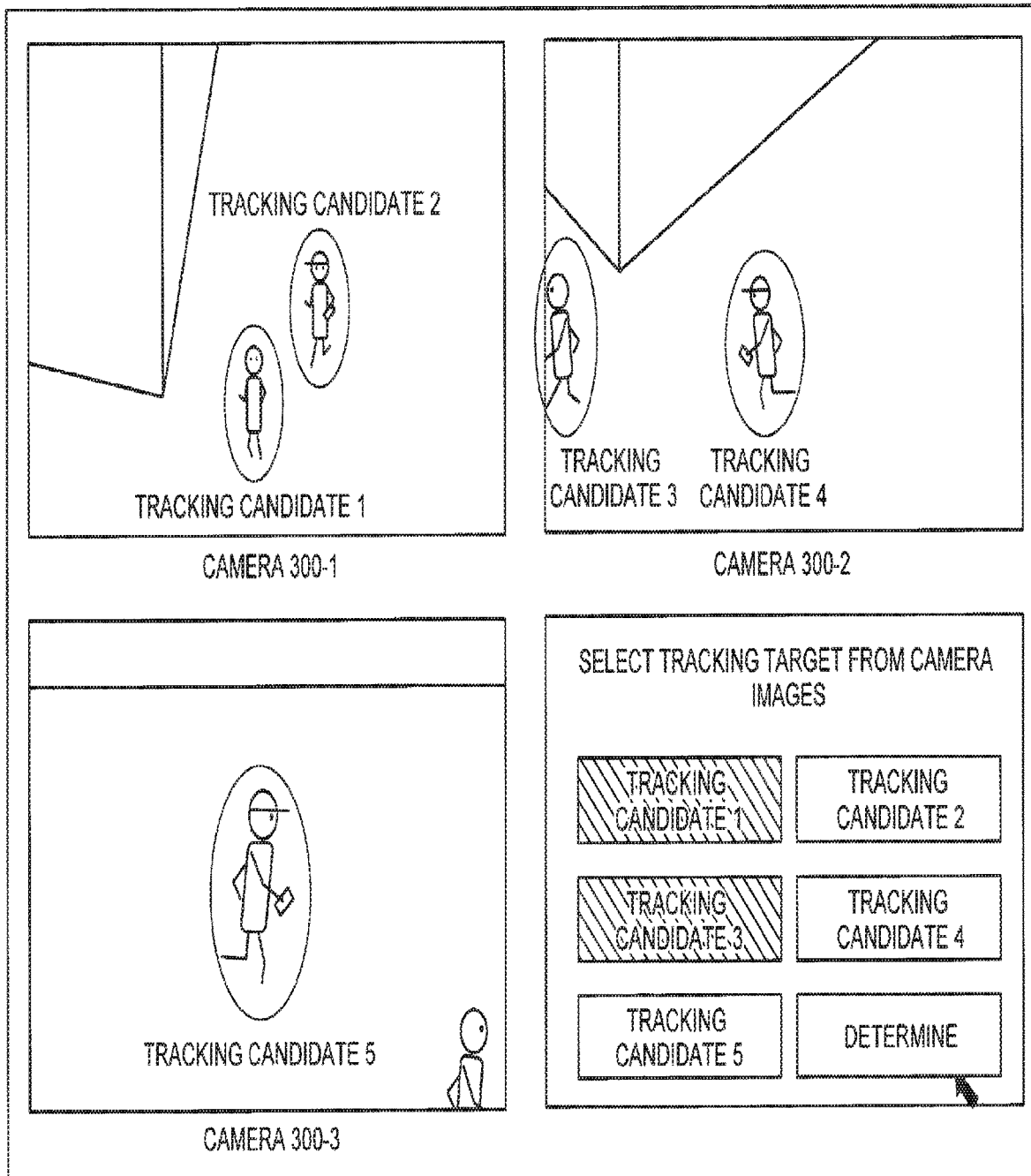
FIG. 10 It depicts a diagram showing a specific example of a display unit of the management device according to the first exemplary embodiment.

FIG. 10 is a diagram showing a specific example of the display unit of the management device according to the first exemplary embodiment. The control unit 1220 displays the images photographed by the cameras 300-1 to 300-3 on the display unit 1230. The control unit 1220 further extracts a tracking candidate 1 to a tracking candidate 5 appearing in each camera image. The control unit 1220 highlights the tracking candidate 1 to the tracking candidate 5 by encircling them in the images photographed by the cameras 300-1 to 300-3. Furthermore, one or more tracking candidates can be selected so that the tracking target can be determined from the tracking candidate 1 to the tracking candidate 5. In this specific example, the operator of the management device selects the tracking candidate 1 and the tracking candidate 3 from the tracking candidate 1 to the tracking candidate 5 being displayed and presses the determination button, whereby the tracking candidate 1 and the tracking candidate 3 are determined as the tracking targets. The tracking unit 1221 determines the determined tracking targets as tracking targets, and tracks the determined tracking targets. More specifically, the control unit 1220 controls the camera 300-1 so that the tracking target 1 is photographed around the center of the screen. The control unit 1220 further controls the camera 300-2 so that the tracking target 3 is photographed around the center of the screen.

Figure 11:
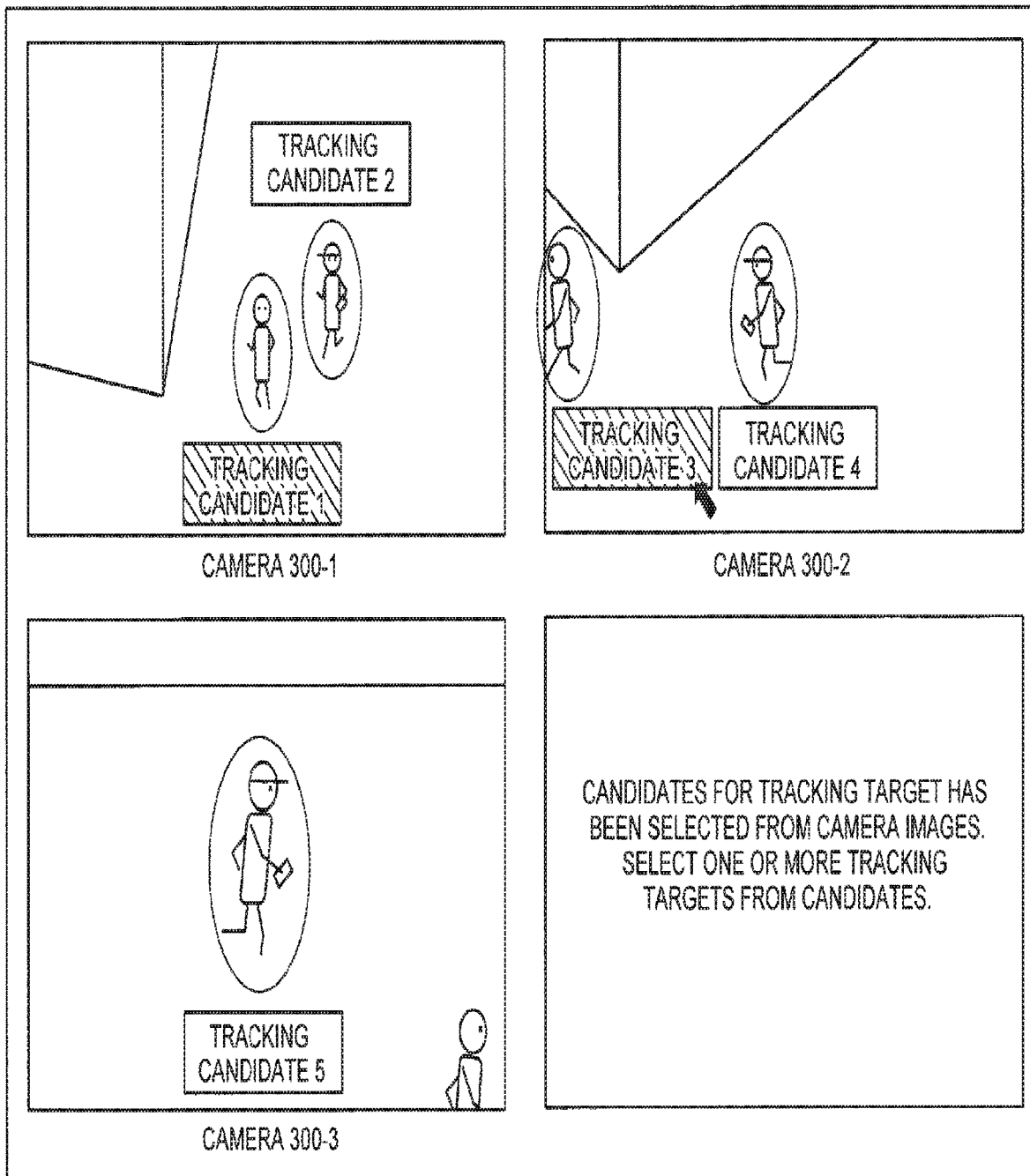
FIG. 11 It depicts a diagram showing a modification of the display unit of the management device according to the first exemplary embodiment.

FIG. 11 shows a modification. In FIG. 10, the operator needs to execute steps of selecting and determining, and the two operations are required. Here, as shown in FIG. 11, the tracking candidates highlighted in the images acquired by the cameras 300-1 to 300-3 may be directly selected. More specifically, the "tracking target 1" in FIG. 11 has turned gray, which indicates a state in which it is selected as a tracking target. The "tracking object 2" has turned white, which indicates a state in which it is not selected as a target. When the "tracking target 1" in FIG. 11 is pressed by the operator, it turns gray as shown in FIG. 11, and the tracking is started. When the "tracking target F" in FIG. 11 is pressed by the operator again, is turns white, and the tracking is stopped. With the above configuration, it is possible to improve visibility and operability of the operator.

(Function and Effect)

Since the position information of the mobile terminal can be sequentially acquired, it is possible to increase the possibility that the camera can capture the security guard or the suspicious person if the security guard is moving. Furthermore, it is possible to select a tracking target which is not a security guard who is a user of the mobile terminal by controlling the cameras and displaying tracking candidates so as to be selectable based on the position information of the mobile terminal. Moreover, the mobile terminal transmits the image of a tracking target such as a suspicious person photographed by itself to the management device in accordance with the transmission of the position information, and whereby it is possible to increase the likelihood of extraction of tracking candidates by the management device and to narrow down tracking candidates.

Second Exemplary Embodiment

In a monitoring system according to the present exemplary embodiment, presence or absence of tracking by a security guard is estimated using an acceleration sensor of a mobile terminal, and when it is determined that the security guard performs tracking, the mobile terminal transmits control switching information to a management device. Furthermore, one monitoring camera to be controlled is selected from a plurality of monitoring cameras. Moreover, before tracking candidates are extracted and an operator of the management device selects a tracking target, tracking a security guard as a provisional tracking target is started.

(Configuration)

Figure 12:
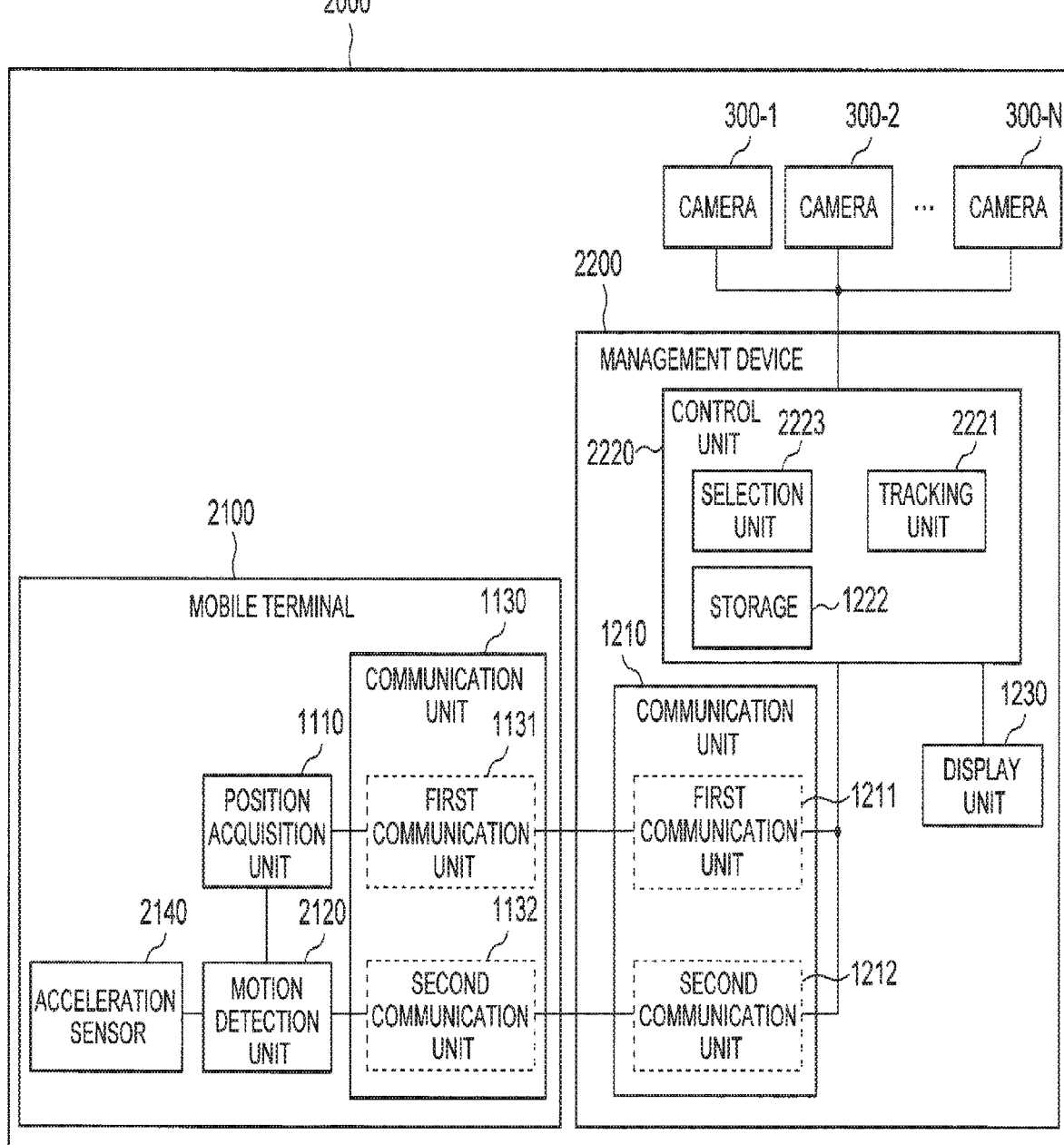
FIG. 12 It depicts a block diagram showing an example of a configuration of a monitoring system according to a second exemplary embodiment.

FIG. 12 is a block diagram showing an example of a configuration of a monitoring system 2000 according to the present exemplary embodiment. Referring to FIG. 12, the monitoring system 2000 includes a mobile terminal 2100, a management device (management server) 2200, and cameras 300-1 to 300-N.

The mobile terminal 2100 includes at least a position acquisition unit 1110, a motion detection unit 2120, a communication unit 1130, and an acceleration sensor 2140. The mobile terminal 2100 has all the hardware configuration of the mobile terminal 1100 in the first exemplary embodiment shown in FIG. 20, and further includes the acceleration sensor 2140.

The position acquisition unit 1110 and the communication unit 1130 are similar to those in the first exemplary embodiment.

The motion detection unit 2120 is connected to the position acquisition unit 1110, the communication unit 1130, and the acceleration sensor 2140. The motion detection unit 2120 detects a predetermined action of a security guard based on the output value of the acceleration sensor 2140. When the predetermined action of the security guard is detected, the motion detection unit 2120 transmits, to the communication unit 1130, control switching information for requesting mode change of camera control to a tracking mode. The motion detection unit 2120 further transmits control the switching information to the position acquisition unit 1110. Here, the predetermined action means that the security guard has found a suspicious person or a suspicious object and is in a tracking state. The motion detection unit 2120 may independently transmit the control switching information by the operation of the security guard similarly to the first exemplary embodiment. The acceleration sensor 2140 may be expressed as a motion detection device which detects vertical acceleration and horizontal acceleration of the mobile terminal 2100.

The management device 2200 includes a communication unit 1210, a control unit 2220, and a display unit 1230. The management device 2200 has a similar hardware configuration to the management device 1200 according to the first exemplary embodiment shown in FIG. 20.

The communication unit 1210 and the display unit 1230 are similar to those in the first exemplary embodiment.

The control unit 2220 includes a tracking unit 2221, a storage 1222, and a selection unit 2223. The control unit 2220 performs camera control similarly to the control unit 1220 in the first exemplary embodiment. The control unit 2220 controls the cameras based on the control switching information acquired by the communication unit 1210. More specifically, the camera is controlled by changing the mode of the camera control from a normal mode to a tracking mode similarly to the first exemplary embodiment.

When the mode is changed to the tracking mode, the tracking unit 2221 extracts a provisional tracking target as a tentative tracking target from the images photographed by the cameras 300-1 to 300-N. In addition, when the mode is changed to the tracking mode, the tracking unit 2221 extracts tracking candidates from the images photographed by the cameras 300-1 to 300-N. The tracking unit 2221 further tracks the tracking target specified by the operator of the management device 2200 from the extracted tracking candidates.

The storage 1222 is similar to that in the first exemplary embodiment.

The selection unit 2223 selects the camera closest to the position of the mobile terminal 2100 based on the acquired position information of the mobile terminal 2100 and the position information of each of the cameras 300-1 to 300-N stored in advance in the storage 1222. Here, the selection unit 2223 selects the closest camera, but the camera is not particularly limited to the closest camera. Specifically, the selection unit 2223 may select the farthest camera. The selection unit 2223 does not necessarily select one camera, and may select all the cameras within a predetermined range from the mobile terminal 1100.

The cameras 300-1 to 300-N are similar to those in the first exemplary embodiment.

(Control by Mobile Terminal)

Figure 13:
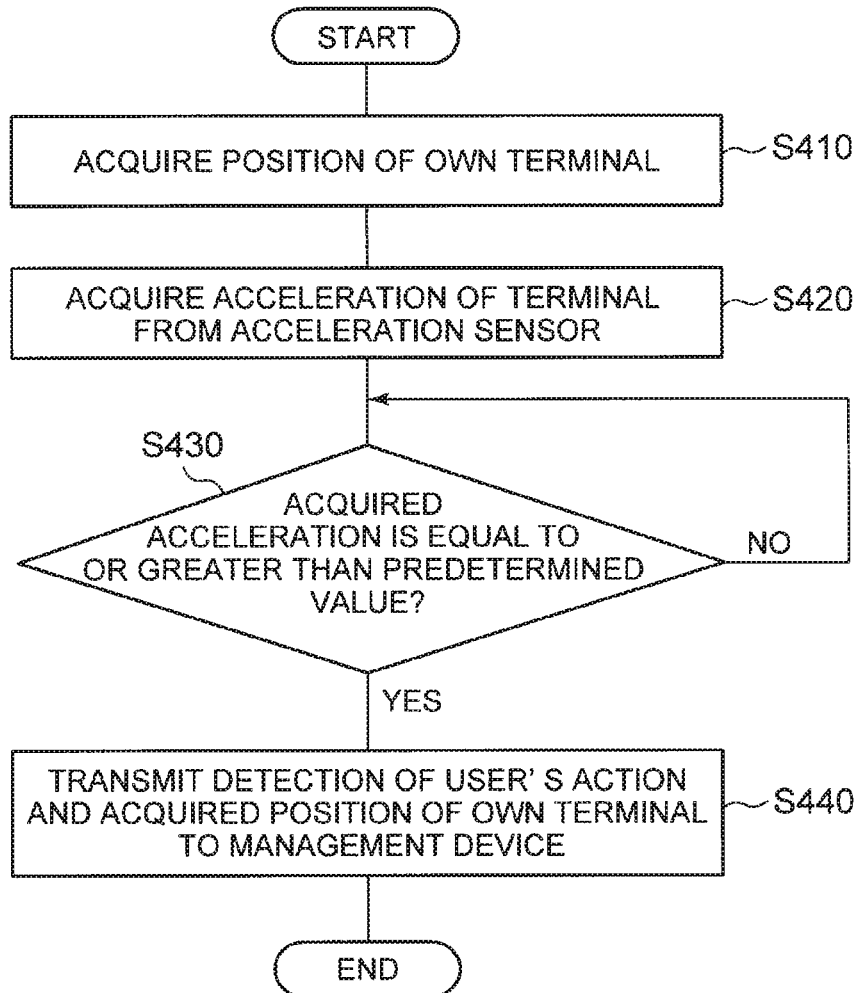
FIG. 13 It depicts a flowchart showing information transmission of a mobile terminal according to the second exemplary embodiment.

Next, a control procedure in the mobile terminal 2100 will be described with reference to FIG. 13. FIG. 13 is a flowchart showing that the mobile terminal 1100 transmits information to the management device 2200.

In step S410, a similar process to step S110 in FIG. 2 is performed.

In step S420, the motion detection unit 2120 accepts the acceleration of the mobile terminal 2100 from the acceleration sensor 2140.

In step S430, the motion detection unit 2120 determines whether the acquired acceleration is equal to or greater than a predetermined value. When the acceleration is equal to or greater than the predetermined value, the motion detection unit 2120 determines that the security guard has performed the predetermined action. The motion detection unit 2120 transmits the control switching information to the second communication unit 1132, and the process proceeds to step S440. When the acceleration is less than the predetermined value, the motion detection unit 2120 determines that the security guard has not performed the predetermined action, and the process returns to step S420 to detect the acceleration again. Here, the motion detection unit 2120 determines that the security guard has performed the predetermined action simply by checking the predetermined value of the acceleration, but the motion detection unit 2120 may determine that the security guard has performed the predetermined action when the period of time in which the acceleration is equal to or greater than the predetermined value exceeds a certain period.

In step S440, a similar process to step S130 in FIG. 2 is performed, and the procedure is ended.

(Camera Control by Management Device)

Figure 14:
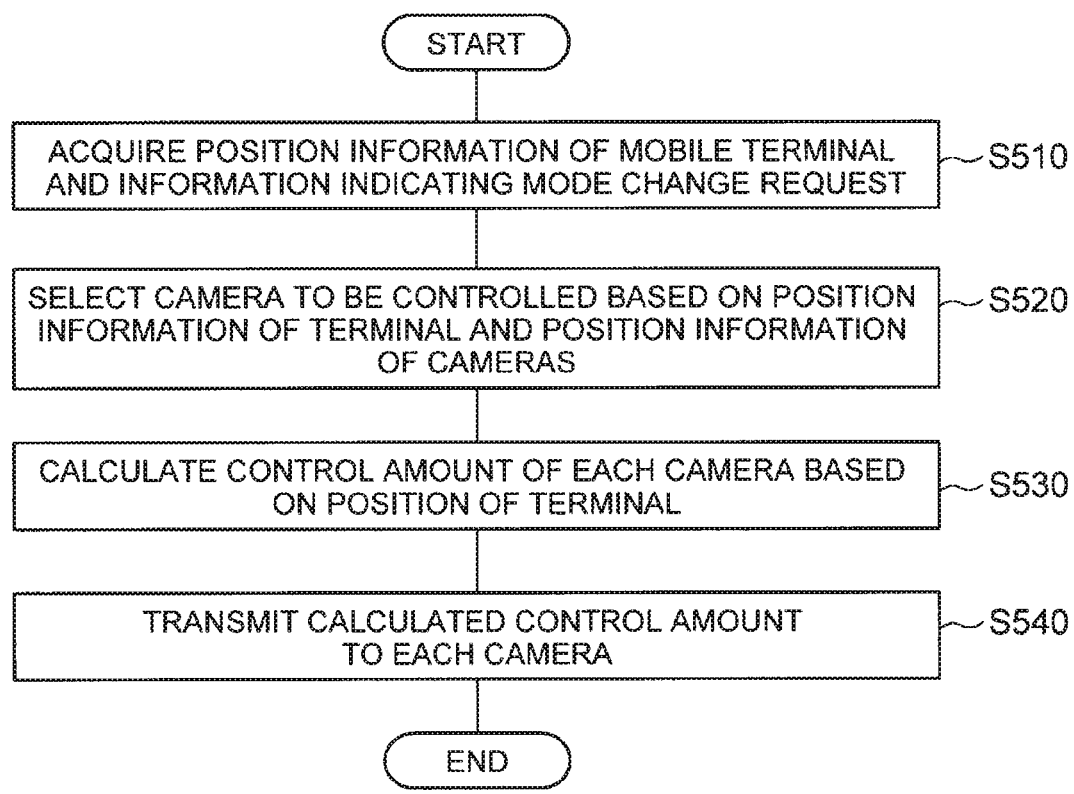
FIG. 14 It depicts a flowchart showing camera control by a management device according to the second exemplary embodiment.

Next, a procedure in which the management device 2200 controls the cameras 300-1 to 300-N will be described with reference to FIG. 14 and the following Table 1. FIG. 14 is a control flowchart showing that the management device 2200 controls the photographing ranges of the cameras 300-1 to 300-N. Table 1 shows the position information of each of the cameras 300-1 to 300-N stored in the storage 1222.

In step S510, a similar process to step S210 in FIG. 3 is performed.

In step S520, the selection unit 2223 compares the acquired position information of the mobile terminal 2100 with the position information of each of the cameras 300-1 to 300-N as shown in the following Table 1, and selects the camera closest to the position of the mobile terminal 2100. More specifically, when the real world coordinates, which are the acquired position information of the mobile terminal 2100, are at 35 degrees 63 minutes 81.100 seconds north latitude and at 139 degrees 74 minutes 72.894 seconds east longitude, the selection unit 2223 compares the degrees of north latitude and east longitude of each camera with the degrees of north latitude and east longitude of the acquired position information of the mobile terminal 2100, and calculates the difference. The selection unit 2223 selects the camera having the smallest calculated difference from the cameras 300-1 to 300-N. When a plurality of cameras is selected, the selection unit 2223 calculates each difference using the minutes of north latitude and east longitude, and selects the camera having the smallest difference. When a plurality of cameras is further selected, the selection unit 2223 performs comparison with the seconds of north latitude and east latitude, and selects the camera having the smallest difference. At this point, when there is a plurality of cameras having the smallest difference, the selection unit 2223 selects all of the cameras as target cameras. In this specific example, the camera 300-N is selected.

TABLE 1

| Camera number Camera position information |
|---|
| lat. 35° 64'95.298" N. |
| long. 139° 74'84.257" E. |
| lat. 35° 65'13.553" N. |
| long. 139° 74'91.684" E. |
| lat. 35° 64'83.119" N. |
| long. 139° 74'71.894" E. |

In step S530, a similar process to step S220 in FIG. 3 is performed. Here, in this step, it is possible to further detect the moving direction of the security guard and control the camera by predicting the current position of the security guard. Specifically, the control unit 2220 periodically receives the position information and the transmission time information of the mobile terminal 2100. In addition, the control unit 2220 receives the acceleration and the acceleration direction of the mobile terminal 2100 acquired by the acceleration sensor 2140 of the mobile terminal 2100. Thereafter, the control unit 2220 calculates the expected moving amount of the security guard from the position information, transmission time information, and acceleration of the mobile terminal 2100 received this time. Next, the control unit 2220 predicts the position where the mobile terminal 2100 is to be located at the current time based on the calculated expected moving amount and the acquired acceleration direction. Finally, the control unit 2220 controls the pan, tilt, and zoom of each of the cameras 300-1 to 300-N by the above method so as to include the predicted position of the mobile terminal 2100 in the photographing range.

In step S540, a similar process to step S230 in FIG. 3 is performed, and the procedure is ended.

(Tracking Control by Management Device)

Figure 15:
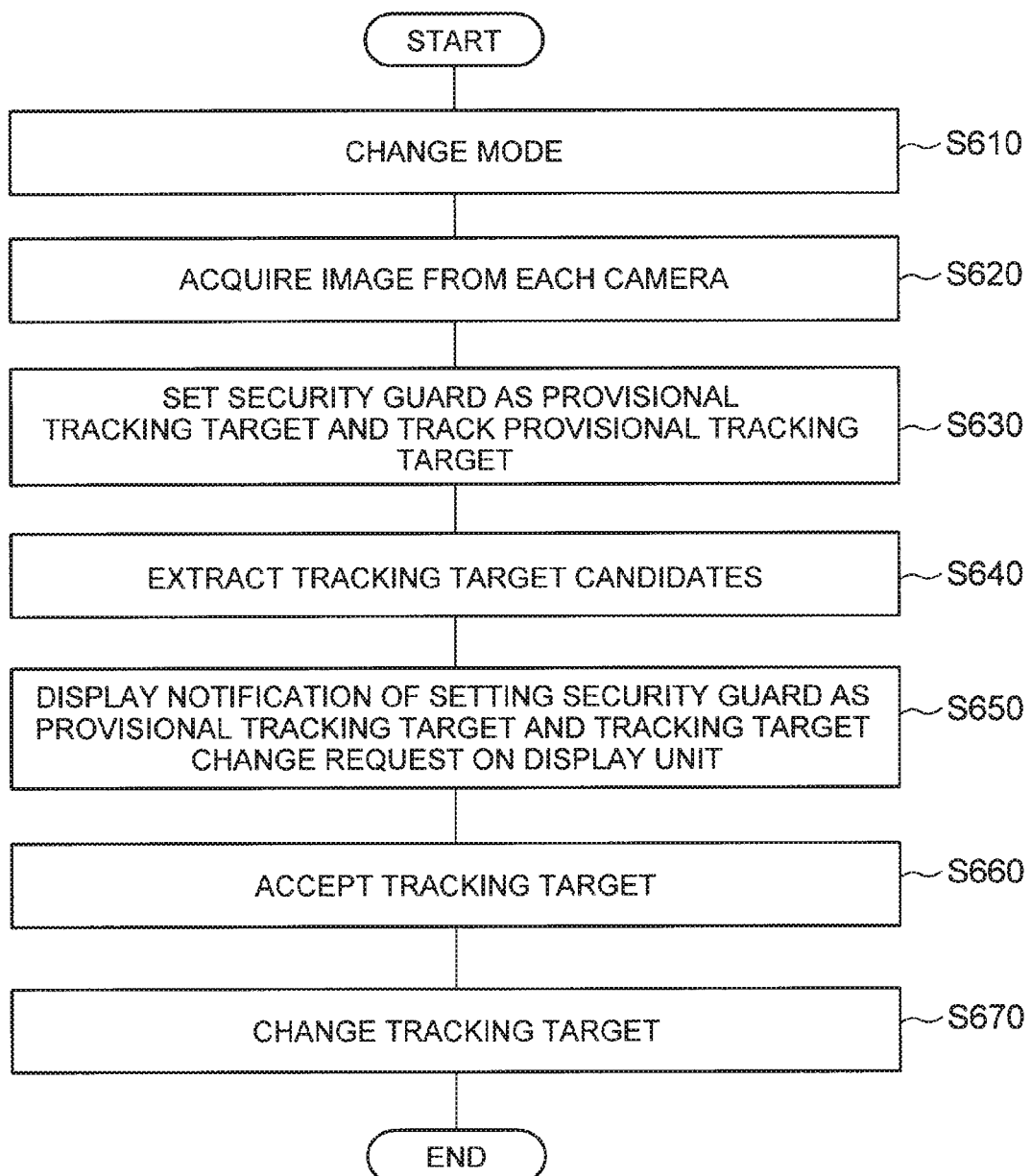
FIG. 15 It depicts a flowchart showing that the management device according to the second exemplary embodiment tracks a tracking target.

Next, a procedure of tracking control by the management device 2200 will be described with reference to FIG. 15. FIG. 15 is a flowchart of tracking control in which the management device 2200 performs tracking.

In step S610, a similar process to step S310 in FIG. 4 is performed.

In step S620, a similar process to step S320 in FIG. 4 is performed.

In step S630, the tracking unit 2221 extracts a feature amount from the acquired image. The tracking unit 2221 compares the acquired feature amount with the feature amount of security guards stored in advance in the storage 1222, and extracts a security guard. Then, the tracking unit 2221 determines the extracted security guard as a provisional tracking target. The tracking unit 2221 further tracks the determined provisional tracking target. The tracking method is similar to the tracking algorithm in the first exemplary embodiment.

In step S640, a similar process to step S330 in FIG. 4 is performed.

In step S650, the tracking unit 2221 outputs, to the display unit 1230, the images photographed by the cameras 300-1 to 300-N acquired in step S620, the provisional tracking target set in step S630, and the tracking candidates extracted in step S640. The display unit 1230 displays the images photographed by the cameras 300-1 to 300-N acquired in step S620 and highlights the provisional tracking target set in step S630 and the tracking candidates extracted in step S640 by encircling them in the screen. As the highlighting, various method of enclosing a detection object by a line, filling a detection object with a marker, or the like can be used.

In step S660, a similar process to step S350 in FIG. 4 is performed.

In step S670, the tracking unit 2221 changes the tracking target from the provisional tracking target to the designated tracking target based on the designation of the tracking target, and continues the tracking. The specific detection algorithm of the tracking target is similar to that in the first exemplary embodiment.

Specific Example of Second Exemplary Embodiment

Next, a specific example of the second exemplary embodiment will be described with reference to FIGS. 5, 16, and 17. FIG. 5 shows a configuration similar to that described in the first exemplary embodiment. In FIG. 5, when the security guard finds a suspicious person, the security guard moves in the direction toward the suspicious person to secure the suspicious person without operating the mobile terminal 2100. The acceleration sensor 2140 of the mobile terminal 2100 acquires the acceleration of the security guard. When detecting that the acquired acceleration is equal to or greater than the predetermined acceleration, the motion detection unit 2120 transmits control switching information to the management device 2200 via the second communication unit 1132.

Figure 16:
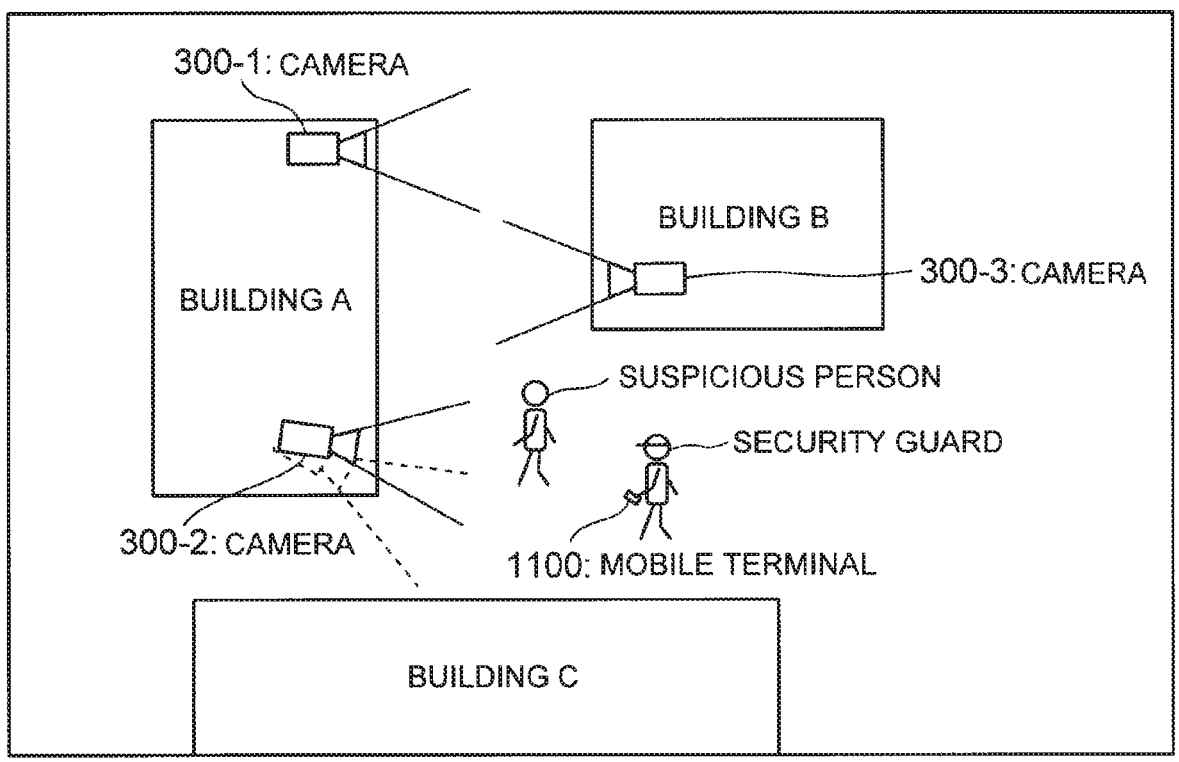
FIG. 16 It depicts an overhead view showing a specific example of the camera control by the management device according to the second exemplary embodiment.

FIG. 16 is an overhead view of camera control by the management device according to the second exemplary embodiment. In FIG. 16, the control unit 2220 acquires the images from the cameras 300-1 to 300-3. The control unit 2220 selects the camera 300-2 closest to the position of the mobile terminal 2100 based on the position information of each of the cameras 300-1 to 300-3 and the position information of the mobile terminal 2100. The control unit 2220 further turns the visual-line direction of the camera 300-2 to the acquired position of the mobile terminal 2100.

Figure 17:
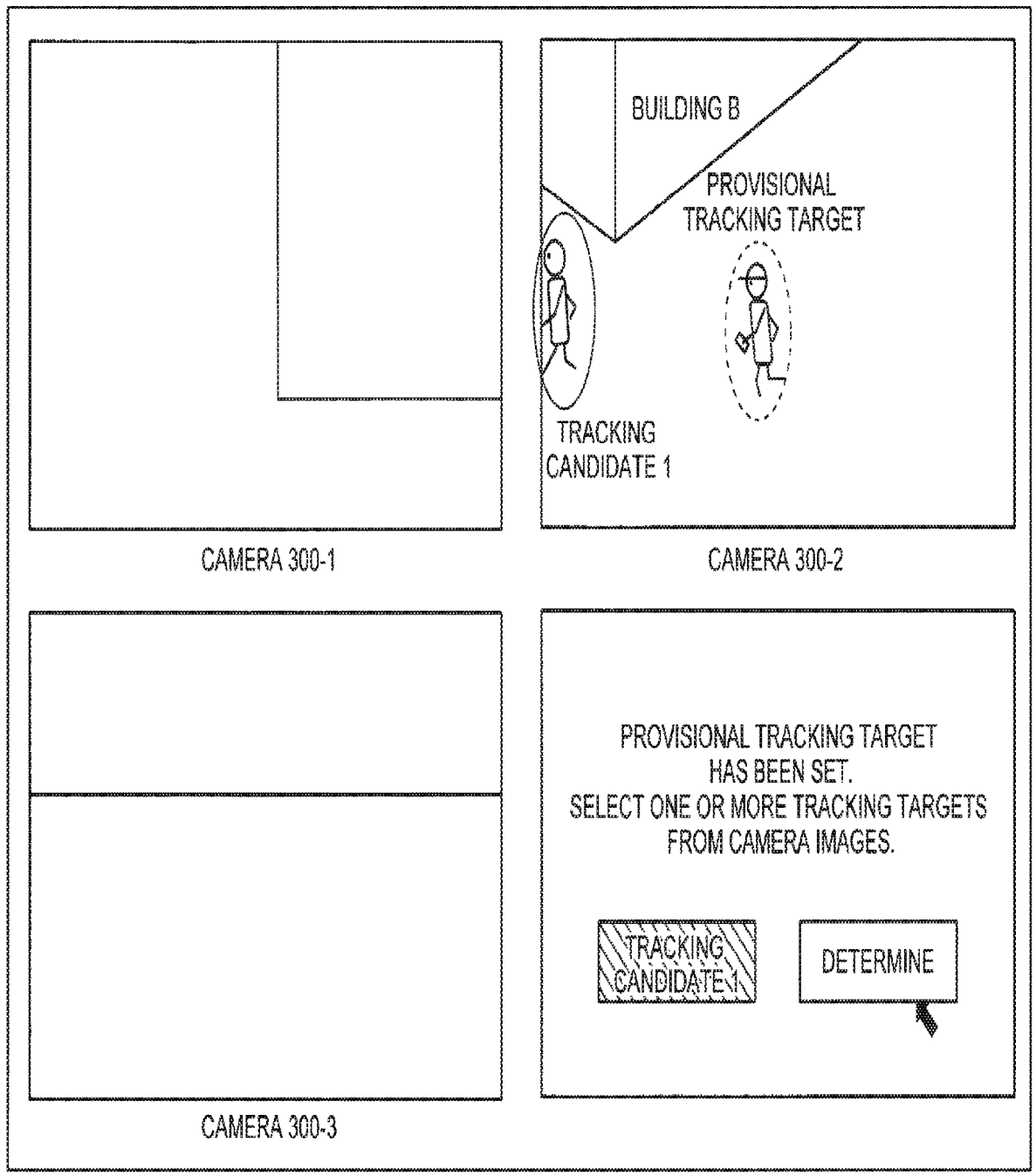
FIG. 17 It depicts a diagram showing a specific example of a display unit of the management device according to the second exemplary embodiment.

FIG. 17 is a diagram showing a specific example of the display unit of the management device according to the second exemplary embodiment. The control unit 2220 displays the images photographed by the cameras 300-1 to 300-3 on the display unit 1230. The control unit 2220 extracts the security guard appearing in the camera images and determines it as the provisional tracking target. The control unit 2220 further extracts the tracking candidate 1 appearing in the camera images. The display unit 1230 displays the images photographed by the cameras 300-1 to 300-3 and highlights the provisional tracking target and the tracking candidate 1 by encircling them. The control unit 2220 further controls the display unit 1230 to display one or more tracking candidates so as to be selectable so that the tracking target can be determined from the tracking candidates. That is, with respect to the tracking candidate 1 being displayed on the display unit 1230, the operator of the management device selects the tracking candidate 1 and presses the determination button, and whereby the tracking candidate 1 is changed to the tracking target this time. The control unit 2220 further controls the cameras to track the determined tracking target.

(Function and Effect)

Since the mobile terminal transmits the control switching information to the management device when the presence or absence of the tracking by the security guard is estimated using the acceleration sensor of the mobile terminal and the presence of the tracking by the security guard is estimated, it is possible to notify the management device of the information for changing the mode when the security guard cannot directly operate the mobile terminal nor transmit the control switching information, that is, when the security guard needs to immediately track a suspicious person or a suspicious object. Furthermore, by selecting a monitoring camera to be controlled from a plurality of monitoring cameras, it is possible to capture an object with a minimum number of cameras by restricting the number of monitoring cameras. Moreover, by starting tracking the security guard as a provisional tracking target before tracking candidates are extracted and the operator of the management device selects a tracking target, it is possible to reduce the communication amount and the communication time with the mobile terminal.

Third Exemplary Embodiment (Feature of the Invention)

In a configuration in which a mobile terminal periodically transmits position information to a management device, a cycle of acquiring the position of the mobile terminal is shorten when control switching information is transmitted. When the operator of the management device determines a tracking target, the mobile terminal ends the control for shortening the period. In addition, a provisional tracking target is automatically switched to a tracking target which is the object to be actually tracked.

(Configuration)

The functional block and the hardware configuration in the third exemplary embodiment are similar to those in the second exemplary embodiment.

(Control by Mobile Terminal)

Figure 18:
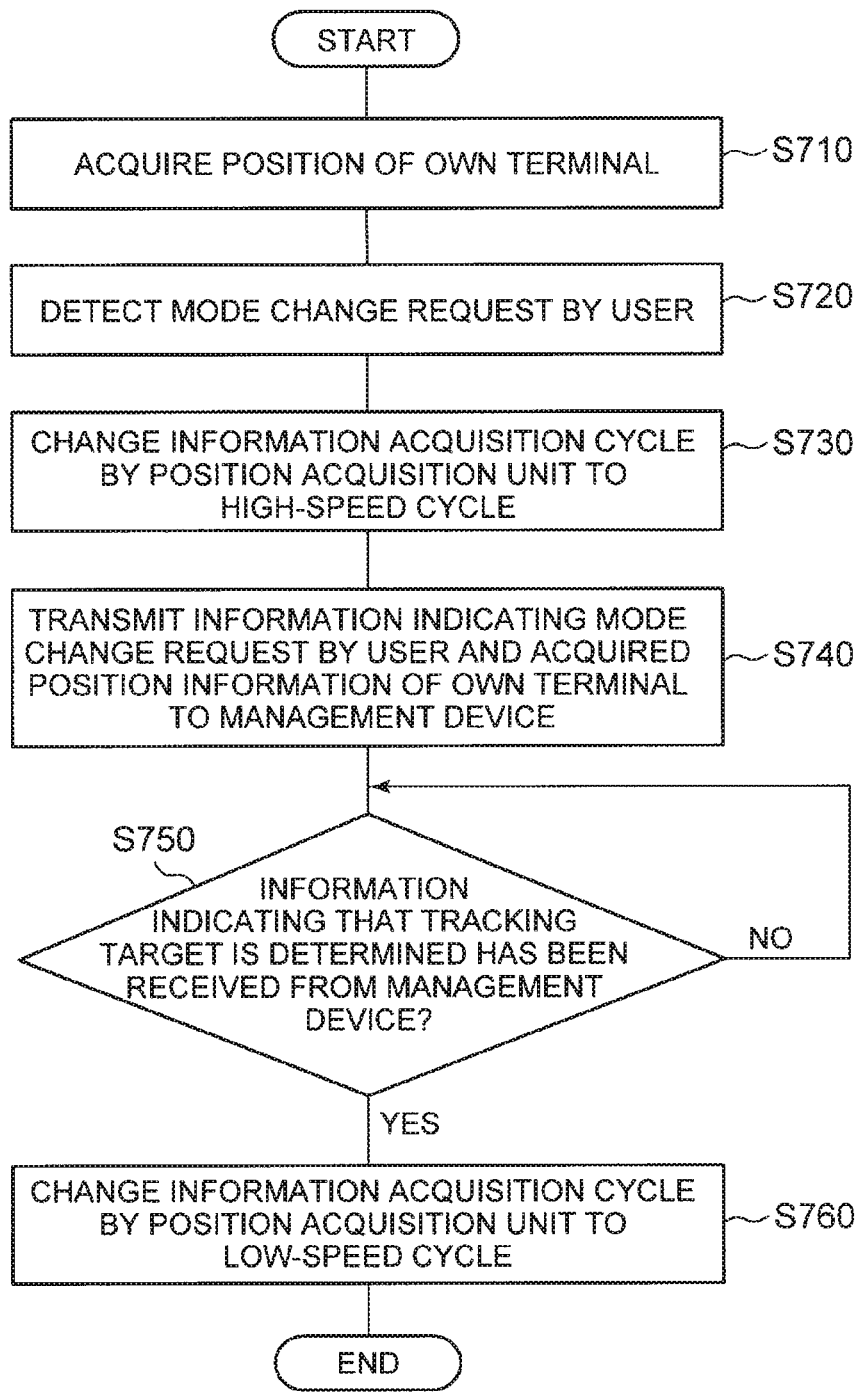
FIG. 18 It depicts a flowchart showing information transmission of a mobile terminal according to a third exemplary embodiment.

Next, a control procedure in a mobile terminal 2100 will be described with reference to FIG. 18. FIG. 18 is a flowchart showing that the mobile terminal 2100 transmits information to a management device 2200.

In step S710, a similar process to step S110 in FIG. 2 is performed.

In step S720, a similar process to step S120 in FIG. 2 is performed.

In step S730, a position acquisition unit 1110 acquires control switching information from a motion detection unit 2120. When acquiring the control switching information, the position acquisition unit 1110 changes the acquisition cycle of the position information to be acquired by itself to a high-speed cycle faster than a low-speed cycle which is a normal acquisition cycle. Specifically, when accepting the control switching information during updating is performed with a cycle of ten seconds (low-speed cycle) in the case where there is no control switching information, the position acquisition unit 1110 changes the position acquiring cycle of itself to a cycle of two seconds (high-speed cycle). Here, a first communication unit 1131 transmits the position information to the management device 2200 every time the position information acquired by the position acquisition unit 1110 is acquired, but a cycle may be set in the first communication unit 1131 and be changed according to the control switching information.

In step S740, a similar process to step S130 in FIG. 2 is executed.

In step S750, the position acquisition unit 1110 determines whether a tracking unit 2221 of the control unit 2220 has acquired information indicating that the tracking target has been set. When the position acquisition unit 1110 determines that the tracking unit 2221 has not acquired the information indicating that the tracking target has been set, the process remains at step S750. When the position acquisition unit 1110 determines that the tracking unit 2221 has acquired the information indicating that the tracking target has been set, the process proceeds to step S760.

In step S760, when the tracking unit 2221 has acquired the information indicating that the tracking target has been set, the position acquisition unit 1110 changes the cycle from the high-speed cycle to the low-speed cycle. After that, the procedure is ended.

(Camera Control by Management Device)

Since the camera control by the management device is a similar control procedure to that in FIG. 14 in the second exemplary embodiment, the description thereof is omitted.

(Tracking Control by Management Device)

Figure 19:
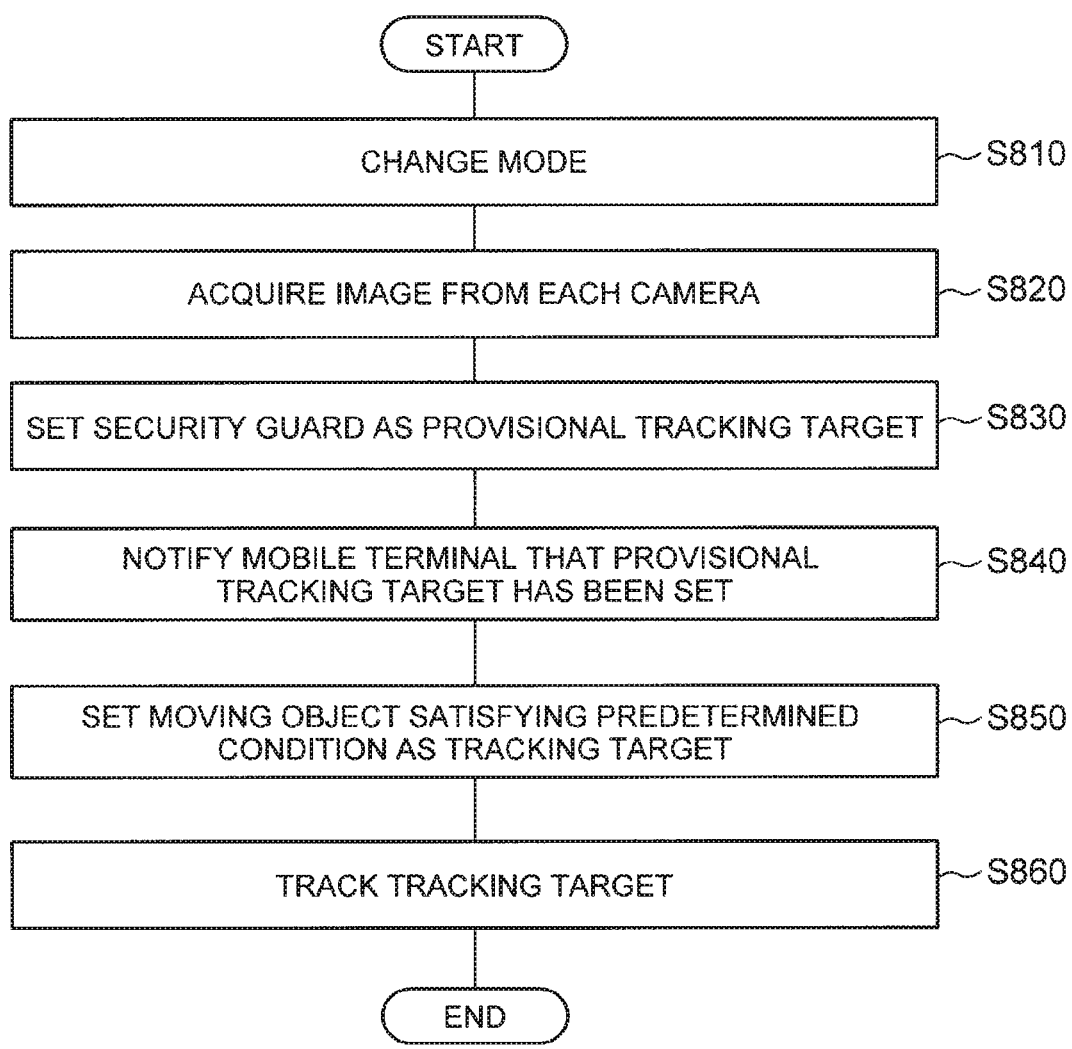
FIG. 19 It depicts a flowchart showing that a management device according to the third exemplary embodiment tracks a tracking target.

Next, a control procedure of tracking control in the management device 2200 will be described with reference to FIG. 19. FIG. 19 is a flowchart of tracking control in which the management device 2200 performs tracking.

In step S810, a similar process to step S310 in FIG. 4 is performed.

In step S820, a similar process to step S320 in FIG. 4 is performed.

In step S830, a similar process to step S630 in FIG. 15 is performed.

In step S840, the control unit 2220 transmits information indicating that the provisional tracking target has been set to the mobile terminal 2100 via the communication unit 1210. Here, the control unit 2220 transmits to the mobile terminal 2100 the information indicating that the provisional tracking target has been set, but may transmit to the mobile terminal 2100 the information indicating that the tracking target has been set when the tracking target is determined in step S870 which will be described later.

In step S850, the tracking unit 2221 detects, from the images photographed by cameras 300-1 to 300-N, a moving object the comparison result of which with the provisional tracking target satisfies a predetermined condition. Then, the tracking unit 2221 sets the detected moving object as a new tracking target. That is, the tracking unit 2221 changes the tracking target from the provisional tracking target which is the security guard to the detected moving object. A more specific determination algorithm will be described below. First, the tracking unit 2221 detects the provisional tracking target and at least one other moving object from a plurality of frames in the images photographed by the cameras 300-1 to 300-N. The tracking unit 2221 compares the image data of the read frames, and acquires the motion vector indicating the moving amount and the moving direction of the provisional tracking target in the image (the angle of view), and the motion vector indicating the moving amount and the moving direction of the other moving object. Next, the tracking unit 2221 sets, as a new tracking target, the other moving object having the motion vector of the substantially same direction as that of the provisional tracking target and the difference of the moving amounts is less than or equal to a predetermined value. At this time, when there are moving objects but are not other moving objects satisfying the predetermined condition, or when a plurality of other moving objects satisfying the predetermined condition is detected, the tracking unit 2221 highlights the extracted moving objects on the display unit 1230 as tracking candidates. The control unit 2220 requests the operator of the management device 2200 to select a tracking target.

In step S860, the tracking unit 2221 sets the tracking target set in step S850 as the new tracking target, and continues tracking. After that, the procedure is ended. The specific detection algorithm of the tracking target is similar to that in the first exemplary embodiment.

(Function and Effect)

By shortening the cycle of acquiring the position of the mobile terminal until the tracking target is determined, it is possible to improve the real-time property of the position information which can be transmitted to the management device, and by setting the trigger at the end of the control for shortening the cycle as the tracking target, it is possible to prevent the cycle of acquiring the position of the mobile terminal from being excessively lengthened. In addition, since the provisional tracking target is automatically switched to the tracking target which is the object to be actually tracked, it is possible to quickly capture the tracking target.

As described above, the present invention has been applied to the above exemplary embodiments as examples. However, the technical scope of the present invention is not limited to the above-described exemplary embodiments. It is apparent for those skilled in the art to variously modify or improve such exemplary embodiments. In such a case, new exemplary embodiments with such modifications or improvements can be included in the technical scope of the present invention. This is apparent from the matters described in the claims.

[Supplementary Note 1]

A monitoring system including:

a mobile terminal; and a management device which communicates with the mobile terminal, in which the mobile terminal includes a first transmission unit which transmits position information of the mobile terminal to the management device at a predetermined interval, and the management device includes a control unit which controls, when acquiring the position information, a direction of a camera based on the position information.

[Supplementary Note 2]

The monitoring system according to supplementary note 1, in which the control unit controls the direction of the camera to a photographing range in which a position indicated by the position information is photographed.

[Supplementary Note 3]

The monitoring system according to supplementary note 1, in which the mobile terminal includes a second transmission unit which transmits, to the management device, control switching information for switching control of the camera when detecting a predetermined action, and the control unit controls, when receiving the control switching information, the direction of the camera based on the position information of the mobile terminal.

[Supplementary Note 4]

The monitoring system according to a supplementary note 1 or 2, in which the management device has a normal mode for monitoring a predetermined range and a tracking mode for performing monitoring based on the position information, and the control unit switches, when receiving the control switching information, the normal mode to the tracking mode and controls the direction of the camera based on the position information of the mobile terminal.

[Supplementary Note 5]

The monitoring system according to any one of supplementary notes 1 to 4, in which the control unit acquires position information of each camera, and the control unit selects at least one camera to be controlled from the camera based on the acquired position information of the camera and the acquired position information of the mobile terminal.

[Supplementary Note 6]

The monitoring system according to any one of supplementary notes 1 to 5, in which the management device includes:

a tracking unit which extracts one or more tracking target candidates based on an image/images acquired from the camera; and a display unit which displays the image/images and highlights the tracking target candidates included in the image/images so as to be selectable.

[Supplementary Note 7]

The monitoring system according to supplementary note 6, in which the tracking unit determines the selected candidate as a tracking target and tracks the tracking target.

[Supplementary Note 8]

The monitoring device according to supplementary note 6 or 7, in which the tracking unit identifies a holder of the mobile terminal based on the image/images acquired from the camera, determines the identified holder as a provisional tracking target, and tracks the provisional tracking target.

[Supplementary Note 9]

The monitoring device according to any one of supplementary notes 6 to 8, in which the tracking unit further extracts a moving object different from the holder of the mobile terminal based on the image/images acquired from the camera, and the display unit highlights the extracted moving object as the tracking target candidate.

[Supplementary Note 10]

The monitoring system according to any one of supplementary notes 1 to 9, in which when detecting the predetermined action, the mobile terminal shortens an interval for acquiring the position information as compared with a case in which the predetermined action is not detected.

[Supplementary Note 11]

The monitoring system according to supplementary note 7, in which when the tracking unit determines the tracking target, the management device changes an interval at which the management device acquires the position information to an acquisition interval for the case in which the predetermined action is not detected.

[Supplementary Note 12]

The monitoring system according to any one of supplementary notes 2 to 11, in which when accepting an input to the mobile terminal, the first transmission unit transmits the position information of the mobile terminal to the management device at the predetermined interval.

[Supplementary Note 13]

The monitoring system according to any one of supplementary notes 2 to 11, in which the mobile terminal further includes an acceleration sensor, and the first transmission unit transmits the position information of the mobile terminal to the management device at the predetermined interval when acceleration acquired by the acceleration sensor is equal to or greater than a predetermined value.

[Supplementary Note 14]

A facility monitoring system including:

a mobile terminal held by a security guard who monitors a specific facility;

a management device which communicates with the mobile terminal and monitor the specific facility; and at least one camera capable of photographing at least a part of the specific facility, in which the mobile terminal includes a first transmission unit which transmits position information of the mobile terminal to the management device at a predetermined interval, and the management device includes a control unit which controls, when acquiring the position information, a direction of the camera based on the position information.

[Supplementary Note 15]

A mobile terminal including:

a first transmission unit which transmits position information of the own terminal to a management device at a predetermined interval, wherein the first transmission unit starts transmitting the position information to the management device when detecting a predetermined action.

[Supplementary Note 16]

The mobile terminal according to supplementary note 15, in which the first transmission unit transmits the position information to the management device at the predetermined interval when accepting an input to the mobile terminal.

[Supplementary Note 17]

The mobile terminal according to supplementary note 15 further including:

an acceleration sensor, in which the first transmission unit transmits the position information to the management device at the predetermined interval when acceleration acquired by the acceleration sensor is equal to or greater than a predetermined value.

[Supplementary Note 18]

A management device including:

an acquisition unit which acquires position information of a mobile terminal at a predetermined interval; and a control unit which controls, when acquiring the position information of the mobile terminal, a direction of a camera based on the position information.

[Supplementary Note 19]

The management device according to supplementary note 18, in which the control unit controls the direction of the camera based on the position information of the mobile terminal when receiving control switching information for switching camera control from the mobile terminal.

[Supplementary Note 20]

A monitoring method including:

acquiring position information of a mobile terminal at a predetermined interval; and controlling, when the position information is acquired, a direction of a camera based on the position information.

[Supplementary Note 21]

A monitoring program for causing a computer to execute processes of acquiring position information of a mobile terminal at a predetermined interval; and controlling, when the position information is acquired, a direction of a camera based on the position information.

[Supplementary Note 22]

A monitoring system including:

a mobile terminal; and a management device which communicates with the mobile terminal, in which the mobile terminal includes a first transmission unit which transmits position information of the mobile terminal to the management device, and the management device includes:

a control unit which controls, when acquiring the position information, a direction of a camera based on the position information;

a tracking unit which extracts one or more tracking target candidates based on an image/images acquired from the camera; and a display unit which displays the image/images and highlights the tracking target candidates included in the image/images so as to be selectable.

[Supplementary Note 23]

The monitoring system according to supplementary note 22, in which the tracking unit determines a selected candidate as a tracking target and tracks the tracking target.

[Supplementary Note 24]

The monitoring system according to supplementary note 22 or 23, in which the tracking unit identifies a holder of the mobile terminal based on the image/images acquired from the camera and tracks the identified holder as a provisional tracking target.

[Supplementary Note 25]

The monitoring system according to any one of supplementary notes 22 to 24, in which the tracking unit further extracts a moving object different from the holder of the mobile terminal based on the image/images acquired from the camera, and the display unit highlights the extracted moving object as the tracking target candidate.

This application claims priority based on Japanese Patent Application No. 2015-052795 filed on Mar. 17, 2015, the disclosure of which is incorporated herein in its entirety.

INDUSTRIAL APPLICABILITY

The present invention is applicable to a monitoring device, a monitoring method, a monitoring program, a monitoring system, and a facility monitoring system which perform monitoring.

REFERENCE SIGNS LIST 1000, 2000 Monitoring system
1100, 2100 Mobile terminal
1110 Position acquisition unit
1120, 2120 Motion detection unit
1130 Communication unit
1131 First communication unit
1132 Second communication unit
2140 Acceleration sensor
1200, 2200 Management device
1210 Communication unit
1211 First communication unit
1212 Second communication unit
1220, 2220 Control unit
1221, 2221 Tracking unit
1222 Storage
2223 Selection unit
1230 Display unit
300-1 to 300-N Camera
100, 200 CPU
130 Display unit
110, 210 Input accepting unit 120, 220 Memory
230 Connection unit

The invention claimed is:

1. A monitoring system comprising:
a mobile terminal held by a security guard; and
a management device configured to communicate with the mobile terminal,
wherein the mobile terminal includes at least one processor configured to:
transmit a request for switching a mode of control of a camera to the management device when a predetermined action performed by the security guard is detected; and
transmit position information of the mobile terminal to the management device, and
wherein the management device includes at least one processor configured to:
switch, when the request is received, the mode of control of the camera to a tracking mode in which the at least one processor in the management device controls a direction of the camera based on the position information in such a way that the camera is directed to a place indicated by the position information;
cause a display device to display an image generated by capturing by the camera whose direction has been controlled;
accept designation of at least one tracking target, the at least one tracking target being designated from among moving objects in the displayed image by an operator;
perform tracking control comprising controlling a photographing range of the camera in such a way that the designated at least one tracking target is kept captured by the camera;
extract the security guard appearing in the displayed image and determine the security guard as a provisional tracking target; and
accept the designation of the at least one tracking target while tracking the provisional tracking target.

2. The monitoring system according to claim 1, wherein the mobile terminal further comprises an acceleration sensor,
wherein the at least one processor in the mobile terminal is further configured to:
acquire an acceleration of the mobile terminal from the acceleration sensor; and
transmit the acquired acceleration of the mobile terminal to the management device, and
wherein the at least one processor in the management device is further configured to:
receive the acceleration;
calculate a current position of the mobile terminal by using the received acceleration; and
control the direction of the camera in such a way that the camera is directed to the calculated current position.

3. The monitoring system according to claim 1, wherein the mobile terminal further comprises an acceleration sensor, and
wherein the at least one processor in the mobile terminal is further configured to:
acquire an acceleration of the mobile terminal from the acceleration sensor;
determine whether the acceleration is equal to or higher than a predetermined value; and
determine that the predetermined action is performed by the security guard when the acceleration is determined to be equal to or higher than the predetermined value.

4. The monitoring system according to claim 1, wherein the mobile terminal performs photographing in response to an operation by the security guard, and
wherein the at least one processor in the mobile terminal is further configured to transmit the image generated by the photographing to the management device together with the position information and the request.

5. A monitoring method comprising:
receiving a request for switching a mode of control of a camera from a mobile terminal, the mobile terminal being configured to transmit the request to a management device when a predetermined action performed by a security guard is detected;
receiving position information of the mobile terminal from the management device;
switching, when the request is received, the mode of control of the camera to a tracking mode in which at least one processor in the management device controls a direction of the camera based on the position information in such a way that the camera is directed to a place indicated by the position information;
causing a display device to display an image generated by capturing by the camera whose direction has been controlled;
accepting designation of at least one tracking target, the at least one tracking target being designated from among moving objects in the displayed image by an operator;
performing tracking control comprising controlling a photographing range of the camera in such a way that the designated at least one tracking target is kept captured by the camera;
extracting the security guard appearing in the displayed image and determining the security guard as a provisional tracking target; and
accepting the designation of the at least one tracking target while tracking the provisional tracking target.

6. The monitoring method according to claim 5, further comprising:
receiving an acceleration of the mobile terminal from the mobile terminal;
calculating a current position of the mobile terminal by using the received acceleration; and
controlling the direction of the camera in such a way that the camera is directed to the calculated current position.

7. A non-transitory computer-readable storage medium storing a program that, when executed, causes a computer to execute operations comprising:
receiving a request for switching a mode of control of a camera from a mobile terminal, the mobile terminal being configured to transmit the request to a management device when a predetermined action performed by a security guard is detected;
receiving position information of the mobile terminal from the management device;
switching, when the request is received, the mode of control of the camera to a tracking mode in which at least one processor in the management device controls a direction of the camera based on the position information in such a way that the camera is directed to a place indicated by the position information;
causing a display device to display an image generated by capturing by the camera whose direction has been controlled;

accepting designation of at least one tracking target, the at least one tracking target being designated from among moving objects in the displayed image by an operator;

performing tracking control comprising controlling a photographing range of the camera in such a way that the designated at least one tracking target is kept captured by the camera;

extracting the security guard appearing in the displayed image and determining the security guard as a provisional tracking target; and accepting the designation of the at least one tracking target while tracking the provisional tracking target.

8. The non-transitory computer-readable storage medium according to claim 7, wherein the program further causes the computer to execute operations comprising:

receiving an acceleration of the mobile terminal from the mobile terminal;

calculating a current position of the mobile terminal by using the received acceleration; and controlling the direction of the camera in such a way that the camera is directed to the calculated current position.

* * * * *